July 2, 1963
H. J. THOMA
3,095,757
TRANSMISSION WITH HYDROSTATIC CONTROL
Filed Nov. 25, 1957
11 Sheets-Sheet 1
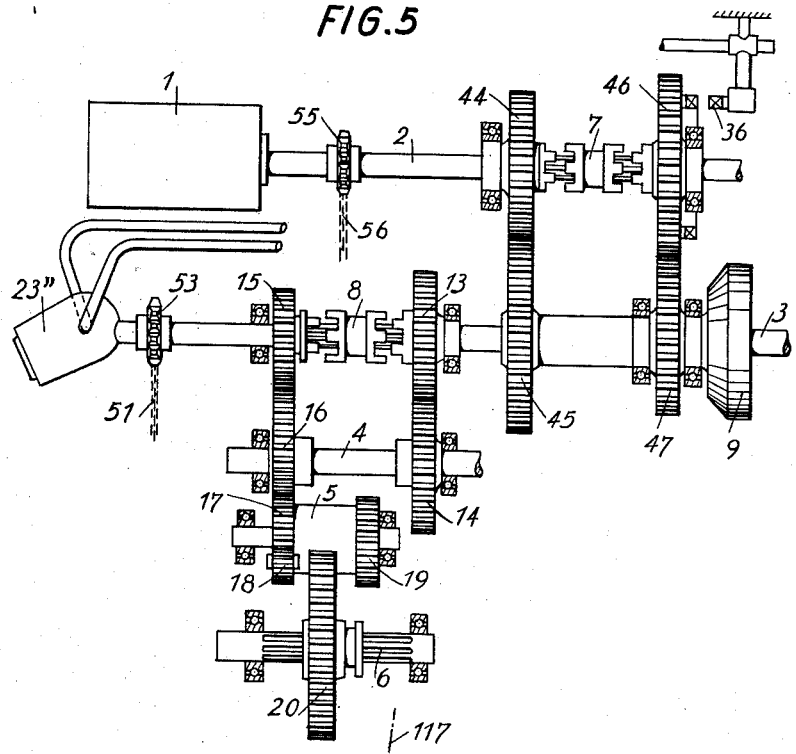
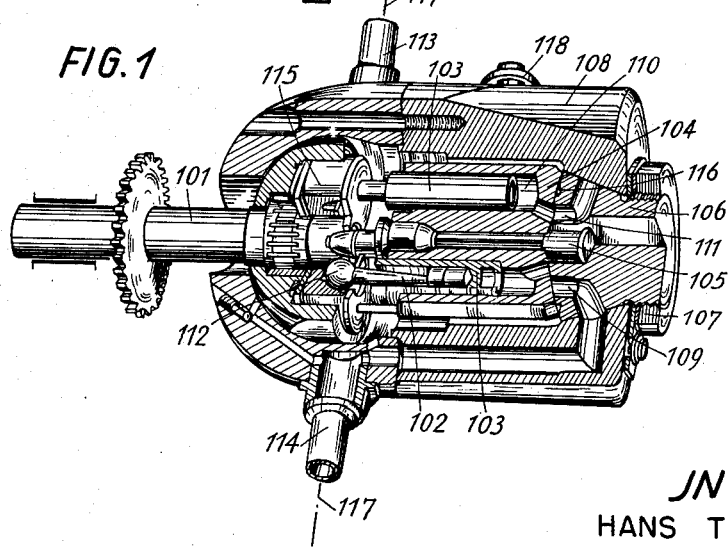
INVENTOR
HANS THOMA
By *Eric D. Frankel*
PATENT AGENT

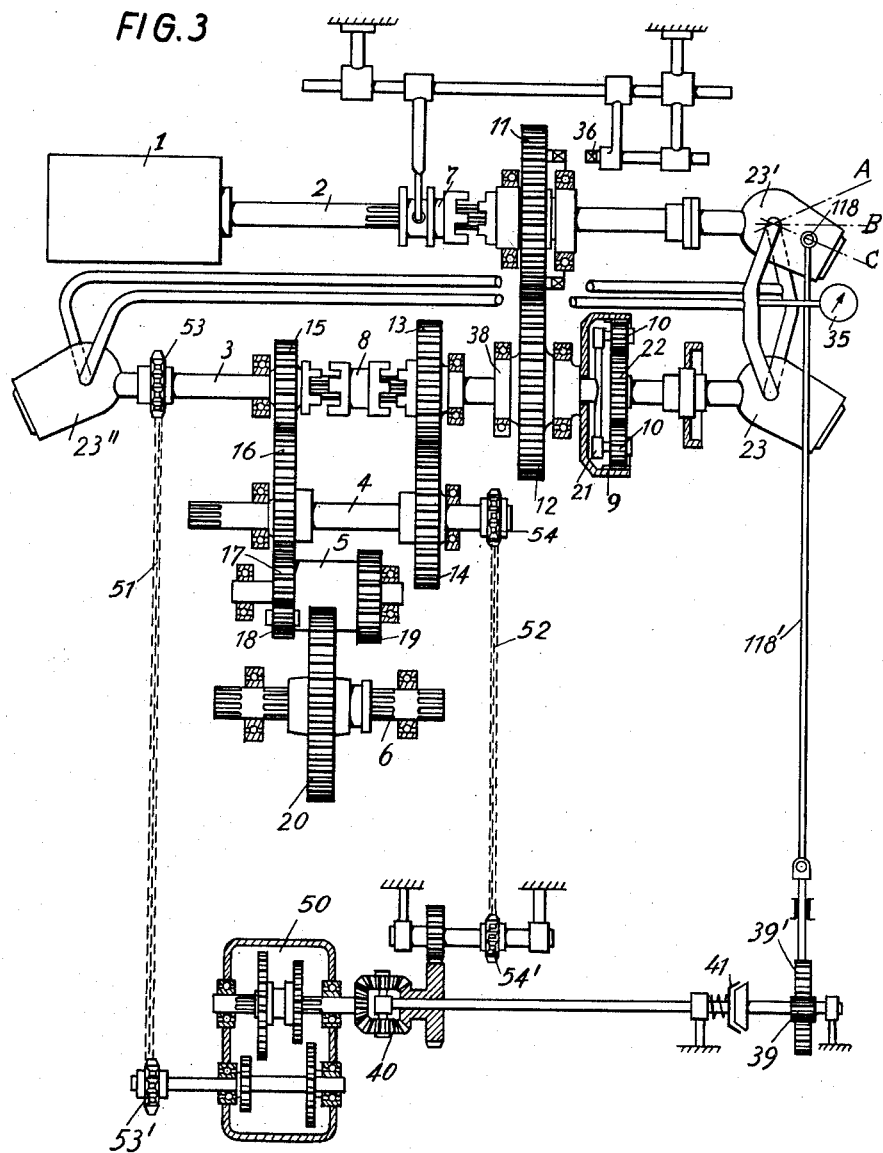

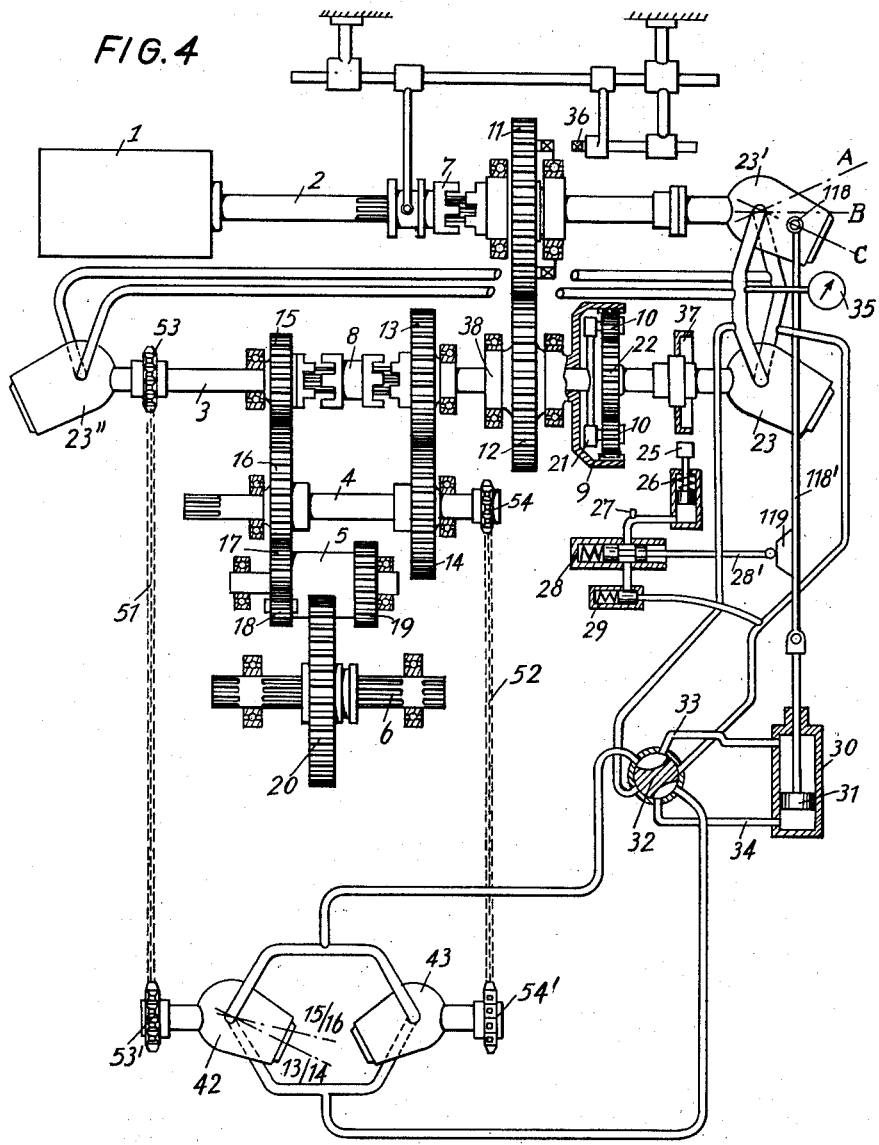

July 2, 1963  H. J. THOMA  3,095,757
TRANSMISSION WITH HYDROSTATIC CONTROL
Filed Nov. 25, 1957  11 Sheets-Sheet 6

INVENTOR
HANS THOMA
PATENT AGENT

July 2, 1963 H. J. THOMA 3,095,757
TRANSMISSION WITH HYDROSTATIC CONTROL
Filed Nov. 25, 1957 11 Sheets-Sheet 8

INVENTOR
HANS THOMA
By Eric D. Frankel
PATENT AGENT

July 2, 1963  H. J. THOMA  3,095,757
TRANSMISSION WITH HYDROSTATIC CONTROL
Filed Nov. 25, 1957  11 Sheets-Sheet 9

INVENTOR
HANS THOMA
By *Eric D. Frankel*
PATENT AGENT

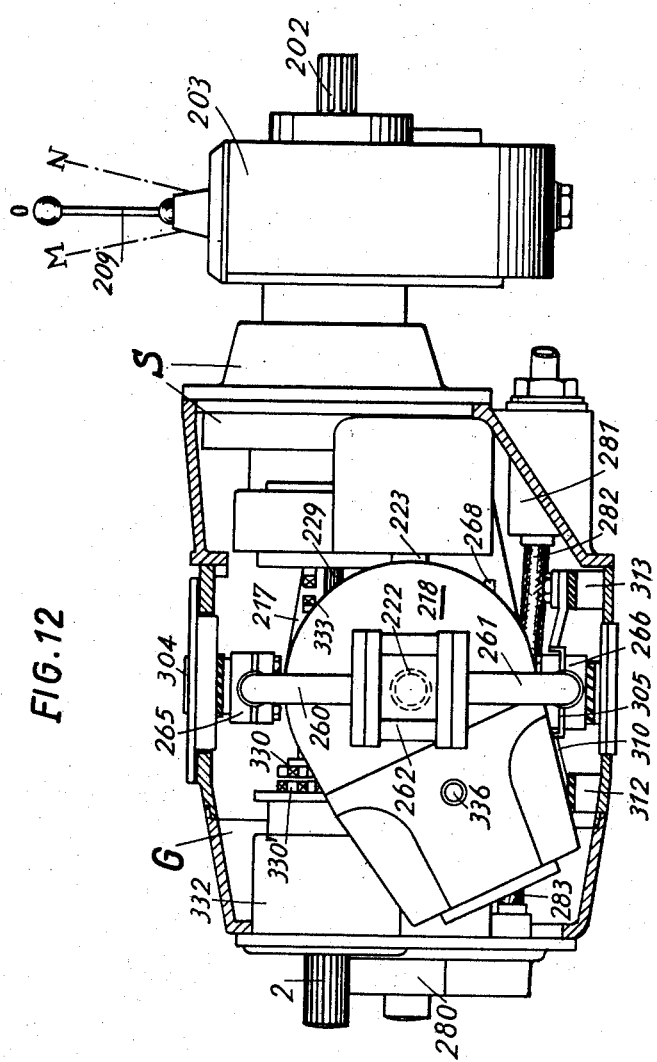

July 2, 1963

H. J. THOMA 3,095,757

TRANSMISSION WITH HYDROSTATIC CONTROL

Filed Nov. 25, 1957

INVENTOR
HANS THOMA

By Eric D. Frankel

PATENT AGENT

United States Patent Office 3,095,757
Patented July 2, 1963

3,095,757
TRANSMISSION WITH HYDROSTATIC CONTROL
Hans Johannes Thoma, Rotfluhstrasse 10,
Zollikon-Zurich, Switzerland
Filed Nov. 25, 1957, Ser. No. 698,783
21 Claims. (Cl. 74—687)

The present invention relates to a hydraulic drive system in combination with a clutch, especially for motor vehicles, but also for many other types of machines.

In prime movers, especially for vehicles, there is generally at least one clutch interposed between the driving engine or motor and the driven shaft of the transmission which is connected to the output side of the engine. This clutch permits the engine and the driven shaft of the transmission to be disconnected from each other. If such a clutch is made in the form of a dog clutch, it becomes necessary both in the design and operation of the transmission to take into account that such a clutch does not permit gradual engagement. It is therefore necessary before the clutch may be engaged to synchronize the speed of the two clutch members, and before it may be disengaged, to relieve the two clutch members of the driving torque.

The above-mentioned requirements not only apply to purely mechanical transmissions but also to hydraulic and mechanical-hydraulic transmissions. The present invention particularly relates to transmissions of the last mentioned type, and its principal object is to provide suitable means applicable to various kinds of transmissions and gears of this type which are connected to the output side of the respective engine or motor for relieving the two members of the clutch from torque, for synchronizing the speed of these two clutch members, and generally for considerably facilitating the operation of the clutch.

A feature of the present invention for attaining these objects consists in the provision of a mechanical-hydraulic transmission which comprises at least one releasable dog clutch or similarly effective clutch interposed in the drive particularly for vehicles but also for other types of machines, and a hydrostatic driving transmission which is superimposed upon the members of the drive mechanism to be connected and disconnected and which consists of individual units which may operate either as a driving element or hydraulic motor or as a pump. For relieving the two clutch members of torque to permit the clutch to be disengaged or for synchronizing the speed of these members to permit the clutch to be engaged, the invention further provides suitable means for controlling the delivery output of fluid from such a transmission unit when operating as a pump or for controlling the power output thereof when operating as a motor in response to the difference in speed of the two clutch members.

Another object is to provide control means for the hydrostatic units to separate certain relatively moving parts thereof while the mechanical clutch is engaged so as to prevent undue friction and wear.

Further objects, features, and advantages of the present invention will be apparent from the following detailed description thereof, particularly when read with reference to the accompanying drawings, in which:

FIG. 1 shows a perspective view of a hydrostatic transmission or drive unit of a type which may be used, for example, in combination with a hydraulic drive for vehicles according to the invention, the housing of which is cut open to show the essential parts thereof;

FIG. 3 shows a drive similar to FIG. 2 with a mechanical means for automatically controlling the operation of the hydrostatic drive unit;

FIG. 4 shows the hydraulic drive according to FIG. 2 in combination with an apparatus for controlling the operation of the hydrostatic drive unit automatically and hydraulically;

FIG. 5 shows a hydraulic drive which differs from that illustrated in FIG. 2 by the additional provision of a change-speed gear between the driving engine and the superimposed transmission;

FIG. 12 shows a longitudinal section taken through the gear housing with the interior parts illustrated in elevation;

FIG. 13 shows a diagrammatic illustration of a hydraulic drive for a motor vehicle with the control elements necessary for operating the drive; while

Figure 2:
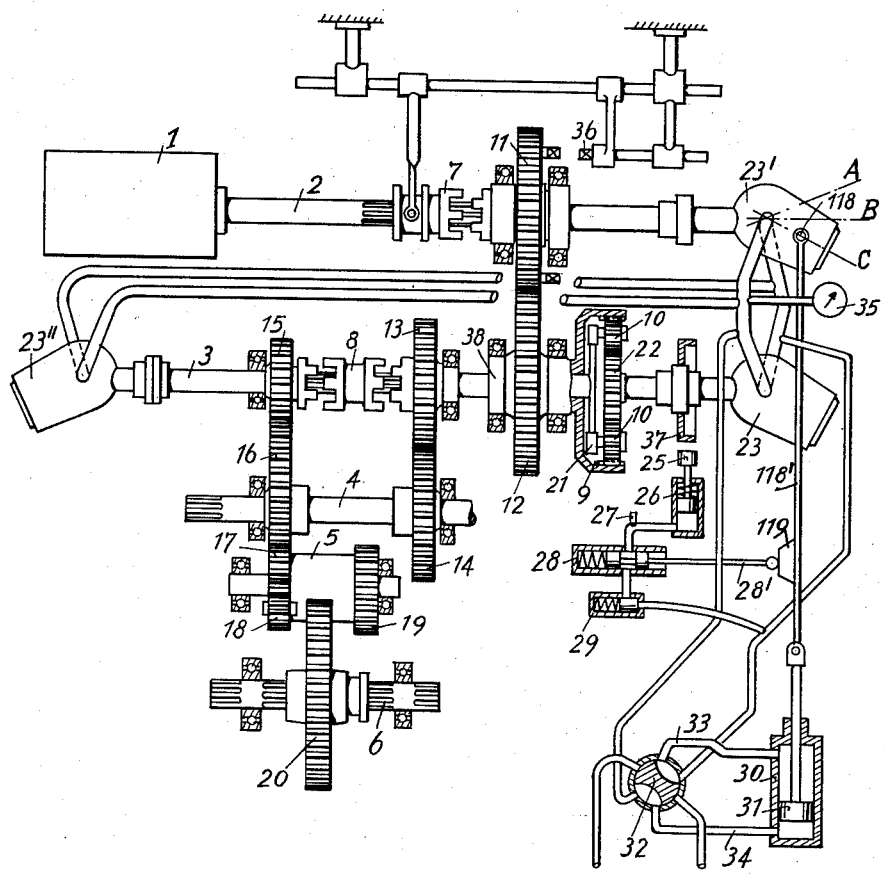
FIG. 2 shows diagrammatically and partly in cross section a hydraulic drive for a vehicle in combination with a change-speed gear wherein the gear shaft carrying the gears to be shifted may be driven partly by the main drive shaft and partly by a drive unit as illustrated in FIG. 1 operating as a motor.

Referring to the drawings, FIG. 1 shows perspectively the interior of a multi-cylinder piston unit in which the pistons operate in the axial direction and which is given primarily to illustrate the meaning of the terms "hydrostatic drive" or "hydrostatic drive unit." Several such units may be combined to form a hydrostatic drive and may be used either as a pump or as a motor. Such hydrostatic units have been described, for example, in the British Patent No. 402,502 and in the U.S. patent to Gabriel No. 2,430,764. The piston unit illustrated in FIG. 1 comprises a main power transmitting shaft 101 which usually is connected to a motor for example, an electric motor or an internal combustion engine, by means of a flexible coupling which is movable in both axial and radial directions. When the motor is started, power transmitting shaft 101 will be rotated. On its inner end extending into the housing 108, power transmitting shaft 101 carries a driving flange 115 in which the large spherical heads 112 of a piston rod 102 are rotatably mounted. The rotation of shaft 101 transmitted through driving flange 115 thus results in a revolution of piston rods 102 and of pistons 103 thereon, as well as in a rotation of cylinder block 104. This cylinder block 104 may be provided, for example, with seven cylinder bores 110, the axes of which extend parallel to each other and in which pistons 103 may slide back and forth with an oil tight fit. Cylinder block 104 is rotatably mounted on a central shaft 105 and its spherical end surface 116 slidably engages with a corresponding spherical surface of a conical valve member 106 which is secured to housing 108 by means of a ring nut 107. Therefore, housing 108 and valve member 106 are stationary relative to power transmitting shaft 101 and do not participate in its movement.

However, housing 108 may be pivoted about an axis 117—117 and out of the plane of power transmitting shaft 101 whereby the central shaft 105 and thus also the axis of cylinder block 104 may be pivoted so as to extend at a certain angle relative to the axis of power transmitting shaft 101. In such inclined position, during each revolution of drive shaft 101, pistons 103 which are connected by piston rods 102 and the spherical heads 112 thereof to power transmitting shaft 101 must carry out a reciprocatory movement which extends along an approximately sinusoidal curve similarly as in any normal piston machine. The length of the stroke of pistons 103 will thus vary in accordance with the angle to which housing 108 is pivoted about axis 117—117.

During the period in which cylinder block 104 is pivoted back to the position in which its axis extends parallel to power transmitting shaft 101, the piston stroke decreases gradually and smoothly to zero. When housing 108 is pivoted toward the other side, the length of the piston stroke again increases but it is phase-displaced by 180°, with the result that the direction of delivery of pistons 103 is reversed.

The delivery and suction sides of the unit are then exchanged for one another. Such a unit may therefore be used either as a pump or as an oil motor with an infinitely variable oil output, and the parts thereof may be exactly alike when used either as a pump or a motor.

The flow of oil is controlled in the following manner:

The stationary valve member 106 contains two kidney-shaped recesses 109. Cylinder bores 110 in cylinder block 104 terminate at the side facing toward the valve surfaces into bores 111 which extend inwardly in an oblique direction. When cylinder block 104 rotates, these bores move past the kidney-shaped recesses 109. During one-half of each revolution, the oil is sucked or pressed into cylinder bores 110 through one of the two recesses 109, while during the other half of each revolution the oil is discharged through the second recess 109. The individual cylinder bores 110 are therefore successively connected first with the feed pipe 114 at one side and then with the discharge pipes 113 and at the opposite side. The ends of feed and discharge pipes 113 and 114 are designed and mounted so as also to act as pivots of housing 108 so that the latter may be turned about the axis 117, for example, by means of a control rod, handle, or the like which may be connected into a socket 118 on one side of housing 108.

All of the other drawings as subsequently described illustrate different types of transmissions to which the hydrostatic drive units of the type as shown in FIG. 1 may be applied in accordance with the present invention.

FIG. 2 illustrates a first embodiment of the invention, in which a motor 1, which may be either an internal combustion engine or an electric motor, through a shaft 2 drives a gear 11, provided the slidable member of the intermediate dog clutch 7 has been shifted toward the right to engage with the other clutch member. Gear 11 then drives a gear 12 which is mounted on a hollow shaft 38 and is positively connected to an internal rim gear 9. This gear 9 is in mesh with several planet wheels 10 which are mounted on a carrier member 21 which is rigidly secured to shaft 3. Shaft 3 extends through hollow shaft 38 and carries at the other side thereof change gears 13 and 15 which are freely rotatable thereon and each of which has a member of a dog clutch rigidly secured thereto. If the double clutch member 8 which is slidably but non-rotatably mounted on shaft 3 is shifted either to the right or left, another shaft 4 will, through gears 13 and 14 or 15 and 16, respectively, be driven either at a slower or higher rate of speed. Shaft 4 may, for example, form a driven shaft of a vehicle, although this would require at this or another point a reversing gear which may consist, for example, of gears 17 to 20 in combination with suitable dog clutches, not shown, or of a slidable gear 20 and two additional shafts 5 and 6.

The superimposed gearing which consists of the internal ring gear 9 and planet wheels 10 also includes the sun wheel 22 which is coupled to a hydrostatic drive unit 23 of the type as illustrated in FIG. 1 which may function either as a pump or as an oil motor. Furthermore, at least one additional drive unit of the same hydrostatic type, for example, as illustrated at 23', will be required whose power transmitting shaft is coupled to shaft 2 or a similar unit 23" which is coupled to shaft 3. It is also possible to apply all three hydrostatic drive units 23, 23', and 23" in one transmission system and to connect them in the usual manner with pipe lines, oil reservoirs, feed pumps, and valves of various kinds.

The drive mechanism as illustrated in FIG. 2 operates as follows:

A part of the power produced by engine 1 is transmitted through the engaged clutch 7 and the internal rim gear 9 directly to the planet wheel carrier 21 and then, depending upon whether clutch member 8 is shifted toward the right or left through gears 15 and 16 or 13 and 14 to the driven shaft 4. A certain amount of the driving torque is simultaneously transmitted to the sun wheel 22 and, depending upon whether this sun wheel runs either forwardly or in reverse or is hydraulically arrested by drive unit 23, a variable transmission ratio will be attended between shafts 2 and 3. If the respective gears are provided in the proper ratios and drive units 23, 23', and 23" are properly adjusted, it is easily possible in conjunction with the superimposed gear to vary the overall transmission ratio hydraulically so as at least to attain or even slightly exceed the ratio of gears 15 and 16 or 13 and 14 which will permit clutches 7 and 8 to be shifted smoothly in order to change to a different gear ratio. This may be demonstrated as follows:

If the vehicle is driven, for example, by the low ratio gears 15, 16, and the driver wishes to change to the next higher ratio gears 13, 14, he will first accelerate the vehicle by speeding up the forward drive of sun wheel 22 as much as possible. This may be done, for example, without changing the position of unit 23 by pivoting drive unit 23' from its initial position A, which substantially corresponds to the reverse rotation of sun wheel 22, through the position B, which results in a stopping of sun wheel 22, to the position C which substantially corresponds to the largest possible angle of adjustment of the stroke of unit 23' for effecting a rapid forward rotation of sun wheel 22.

Since clutch member 8 then has to be shifted from the left to the neutral position, it is first necessary to relieve the clutch teeth of any torque. For this purpose, drive unit 23' is pivoted from its position C slightly back toward the position B. The teeth of clutch member 8 will thereby be relieved of the torque and the clutch may be easily shifted to its neutral position, provided that engine 1 when being relieved of the load will not or only slightly increase in speed, that is, for example, if it is a synchronous or asynchronous motor as used in electrically driven vehicles or a diesel engine which is provided with a governor. If there is no such governor or if the motor is one which does not develop the torque sufficiently independent of the speed, it would be necessary to interpose a manual operation, for example, by switching off the electric current or interrupting the fuel supply, in order to prevent such motor or engine from racing when relieved of the load as required for disengaging the clutch.

After clutch member 8 has been shifted to its neutral position, it will become necessary to engage it smoothly with the second gear 13, 14. If the engine and the vehicle should in the meantime continue to run at approximately the same speed, the teeth at the right side of clutch member 8 will then revolve at a very great speed relative to the clutch teeth on gear 13 in accordance with the difference in the gear ratio between gears 15, 16 and 13, 14. According to the invention, it is, however, easily possible to reduce this relative speed between the teeth of clutch member 8 and those of gear 13 to zero simply by pivoting the hydrostatic unit 23' beyond its neutral position B in the direction toward the initial position A. Assuming that the engine and the vehicle continue to run without change in speed, the great advantage will be attained by the use of hydrostatic gears that at a fixed position of unit 23 and with unit 23' being adjusted to a certain position, the relative speed between clutch member 8 and the clutch teeth on gear 13 will be overcome entirely, with the possible exception of a very small slipping of a value of no more than 1 or 2% as is characteristic in a good hydraulic transmission and as is even desirable for engaging the clutch.

The identical procedure may be carried out in a gear with more than two gear ratios in order to shift the gears smoothly to any higher ratio. In this connection it is immaterial whether the clutch has normal dog teeth, rounded teeth, or beveled teeth, or whether it consists of relatively slidable wheels, such as the gear 20 relative to the gears 19 and 18.

Finally, it is also possible to reverse the same proceeding in order to shift the gears from a higher to a lower gear ratio. For this purpose, it is only necessary in the above description to exchange the positions A and C of the hydrostatic unit 23' for one another. The use of a hydrostatic drive unit in the superimposed gear system thus permits not only the speed of the clutch members to be accurately synchronized in order to permit the clutch to engage easily and smoothly but also to relieve the clutch of any torque for disengaging the same. It is for this purpose only necessary to check the development of the oil pressure in the circuit of the hydrostatic drive mechanism by means of a pressure gauge 35. If in the operation of the vehicle there may also be reverse torques, it will be necessary to provide such a pressure gauge for each direction, either in the form of a similar gauge for each pressure pipe separately or of a single instrument which can be switched over from one pressure pipe to the other.

The simple adjustability of the hydrostatic units permits these operations of relieving the clutch of the torque before disengaging it and for synchronizing the speed of the other two clutch members for engaging the same to be carried out automatically by the provision of very simple means as subsequently described.

Thus, for example, for relieving clutch 8, a pressure cylinder 30 may be provided, the piston 31 of which is connected through a connecting rod 118' to socket 118 of the control unit 23'. As soon as the four-way valve 32 is turned to the position as illustrated in FIG. 2, the oil pressure will pass into the two pressure pipes 33 and 34 and move piston 31, provided there is a noticeable differential operating pressure and thus also a noticeable torque in the hydraulic gear parts, particularly at sun wheel 22. With proper dimensions and connections of the necessary pipe lines it is thus possible to eliminate the torque on sun wheel 22 and therefore in the entire transmission system as soon as four-way valve 32 is adjusted to the position shown in FIG. 2. Any possible frictional or other losses which might affect the torque at the clutch may be easily compensated by a supplementary action upon piston 31 by suitable valve arrangements, known as such, which affect the oil pressure in cylinder 30.

In the normal operation of the vehicle, four-way valve 32 or a similar control member, for example, a reversing slide, at first is set so that cylinder 30 will not be under pressure or else be acted upon by other pressure impulses. This same cylinder 30 may therefore also act as a servo-motor for controlling the operation of the transmission when the vehicle starts to move or when it is slowed down. Thus, certain predetermined acceleration or deceleration values may be applied at these times.

In the second operation necessary for shifting the gears, the speed of the clutch members which are to be engaged may be synchronized automatically by comparing the desired speed of shaft 3 with the actually prevailing speed, for example, by means of a differential gear.

Such a mechanical control is illustrated in FIG. 3. It consists of a set of small control gears 50, 40 which is driven by shafts 3 and 4 by means of sprocket wheels 53, 53' and 54, 54' and chains 51 and 52, respectively. This gear unit, which, because of the small power required to operate the same, only has to be provided with a simple dog or friction clutch, is used for selecting the transmission ratio appropriate for the new gear stage and for then determining the difference between the desired speed of one shaft and the speed required for shifting clutch 8 by means of the differential gear 40. By engaging a friction clutch 41, a pinion 39, meshing with a rack 39', pivots and adjusts drive unit 23' so that the differential gear or the third shaft thereof will stop together with sun wheel 22 or even start to rotate slowly in the reverse direction. Thus, the two respective clutch members will be properly synchronized to be engaged.

The synchronization of the respective clutch members may be attained in a still more simple manner by hydraulic means, as illustrated, for example, in FIG. 4. The two shafts 3 and 4, the speed of which has to be synchronized in accordance with the ratio of the respective gears to be engaged, are connected to the two small hydrostatic units 42 and 43, at least one of which is adjustable for setting the respective gear ratio. As illustrated in FIG. 4, such change gear may again consist of the two sets of gears 15, 16, and 13, 14, while more than two speeds require a larger number of sets.

Instead of an adjustable hydrostatic unit 42 it is also possible to provide several such units which may be individually connected and disconnected, that is, pumps or hydraulic motors which may be connected together as required in accordance with the respective gear ratios which have been set up. Thus, for example, a two-speed gear would require three oil pumps or hydraulic motors, while a three- or four-speed gear would require four or five hydraulic motors or at least hydraulic motor combinations with forward and reverse feeds.

Irrespective of the particular details of design of this auxiliary hydraulic unit 42, it is thus possible to produce differences in the oil pressure within the individual pressure pipes as soon as the transmission ratio between shafts 3 and 4 differs from the one desired. It is then only necessary to transmit this hydraulic pressure by means of a suitable control member, for example, the valve 32, to the pressure cylinder 30 in order to adjust the drive unit 23' so as to synchronize the clutch members to permit them to be engaged. A premature engagement, that is, one before the speed of the respective clutch members is properly synchronized, may be very simply prevented by measuring the velocity of flow in the lines which are connected to cylinder 30 or, as will be apparent by analogy with the friction clutch 41 according to FIG. 3 by determining the reverse flow at this point.

As compared with the known hydrodynamic converters which are used for bridging the gears to be shifted in a change-speed gear, the apparatus according to the invention as above described has the advantage that the shifting operation may be carried out in a much more simple manner far more accurately, and without requiring complicated means on the clutch members such as, for example, so-called locking dogs. Moreover, the efficiency of the apparatus is very high, not only because a well-designed hydrostatic control unit has a better efficiency than a hydrodynamic unit but because only a small portion of the total power has to be converted hydraulically, which can be attained in the manner illustrated by means of the superimposed system since the hydrostatic transmissions, in contrast to hydrodynamic converters, do not merely stop but even run backwardly when under load.

The result of combining a hydrostatic transmission with a superimposed gear also applies to the known combination of a hydrostatic coupling with one or more hydrostatic drive units. Hydrostatic couplings are such hydrostatic transmission elements wherein not only the rotor, but also the usually stationary housing together with the parts connected thereto can rotate. They have become known extensively in the form of gear pumps with rotatable housings and a pressure oil supply through two oil conduits with intermediate oil-tight swivel joints. The mechanical superimposed gear according to FIG. 2, including the sun wheel 22 and the hydrostatic unit 23 may therefore be simply replaced by a hydrostatic coupling of a known type, particularly since the latter is primarily suitable for small differences in speed. A hydrostatic coupling is illustrated, for example, in a different connection in FIG. 8. This does not in any way affect the essence of the present invention, namely, the application of a hydrostatic drive unit, wherein the oil output of one part is dependent upon the difference in speed of two shafts.

The drive mechanism as illustrated in FIG. 2 still has the disadvantage that it is not readily possible to stop the vehicle or to drive at a snail's pace if the hydrostatic units 23 and 23′ especially are made of such small dimensions as a multiple speed change-speed gear would permit.

This deficiency may be overcome by providing, in place of or aside from the change-speed gear with gears 13 and 15, another method of changing the speed, for example, as disclosed in FIG. 2 in the form of the dog clutch 7. If this clutch member 7 is disengaged, which may also be carried out by the same load-relieving means as described in connection with dog clutch 8, the gear transmission will be in the idling position since the internal rim gear 9 will then evidently be completely free. If, however, the locking tooth 36 is also engaged, the internal gear 9 will be either directly or indirectly arrested, depending upon the location of this locking tooth. The hydrostatic drive unit 23 may then, however, drive the driven shaft 4 through the superimposed gear which then operates purely as an intermediate gear, and through gears 13 to 16. This driven shaft 4 will be stopped when drive unit 23′ is in the position B, it will run forward at a slow speed when drive unit 23′ is in position C, and slowly backwards when it is in position A. It is in this way possible to drive a vehicle forwards or backwards at very slow speeds which is not only extremely suitable, for example, in locomotives for track-switching or parking maneuvers, but also eliminates the above-mentioned disadvantage of a lack of slow speeds in a transmission system which otherwise is designed for a multiple-speed change-speed gear.

If, for example, in the superimposed gear arrangement as illustrated in FIG. 2, the sun wheel 22 is made of a diameter twice as large as that of the planet wheels and therefore of a diameter half as large as that of the internal rim gear 9, the speed of the planet wheel carrier 21 and shaft 3 will, when sun wheel 22 is standing still amount to two-thirds of the speed of the internal gear 9, while when sun wheel 22 travels in the reverse direction at the same speed as the internal gear 9 travels forwardly, the speed of planet wheel carrier 21 and shaft 3 will then amount to one-third of the speed of the internal gear 9. If, on the other hand, the locking tooth 36 is engaged to prevent the movement of the internal gear 9, shaft 3 can evidently travel forwardly at one-third of the speed at which unit 23 also runs forwardly. This transmission system therefore permits the bridging of the entire speed range completely, even if the control range and thus the efficiency of the hydrostatic drive mechanism reaches only one-third of the overall speed. A further improvement or even a substitute for this extension of the control range by the speed control operation of the superimposed gear as just described may also be attained by causing the hydrostatic drive unit 23 according to FIG. 2 to run at a fairly high speed, particularly also in the reverse direction. For this purpose, it would be sufficient to provide this hydrostatic drive unit likewise with a stroke adjusting device. Relatively high speeds as compared with the usual speeds may then be attained, particularly if motor 1, for example, a diesel engine, can be adjusted for starting at low speeds, thus making it possible to enlarge the control range of the transmission system as described, especially at the time when the vehicle starts to move. However, such a stroke reduction of drive unit 23 is a disadvantage as such times, i.e. when the vehicle starts to move, since in this position it is not capable of developing a strong torque. Although such a torque increase would be entirely possible by the provision of a further drive unit 23″ which is connected to shaft 3 of the planet wheel carrier, this would necessitate the expense of a further hydrostatic drive unit.

It is therefore in many cases much more simple to resort to another means, namely, to a brake disk 37, as shown in FIG. 2, whereby the drive unit 23 running in the reverse direction may, at the time of starting, be supplied with an additional torque simply by applying a braking force upon brake disk 37.

This may be attained, for example, by means of a brake block 25 which is pressed against brake disk 37 by the hydraulic pressure produced in a cylinder 26 as soon as the hydraulic operating pressure in drive unit 23 has become so great that the safety valve 29 opens and thereby allows the oil to pass into brake cylinder 26. Suitable control means should be provided to insure that this brake mechanism will operate only when drive unit 23 is running in the reverse direction during the time when the vehicle starts to move, and not at the upper end of the control range of this unit when it operates in the forward direction. For this purpose, the invention further provides a control valve 28 which through a connecting rod 28′ and a cam 119 is connected to and thus adjustable by the connecting rod 118′ leading to drive unit 23′ so as to permit the oil from safety valve 29 to escape from brake cylinder 26 when unit 23′ is running in the forward direction. A pressure release member 27 insures that brake block 25 will be retracted in the event that the operating oil pressure should sink to a low value while the vehicle is still only starting to move and drive unit 23 runs in the reverse direction, and when the pressure-responsive safety valve 29 would therefore be closed.

The mechanical brake mechanism 25, 26 may also be replaced by any other suitable brake, for example, a hydrodynamic brake of a type similar to a Foettinger clutch which is filled with the oil discharged from safety valve 29, as soon as, at the time of starting, the operating pressure becomes too high. Any suitable device, for example, an outlet valve which is controlled by the operating pressure, may then be provided for draining such hydrodynamic brake at the proper time. Because of the considerable quantities of oil involved in such case, a simple outlet opening would be less suitable for this purpose than for the operating cylinder of a mechanical brake 26, as shown in FIG. 2 which requires only a small quantity of oil. Instead of such brakes it is also very well possible to use an electromagnetic brake or an eddy-current brake with similar means for engaging and disengaging the same.

A drive mechanism of this kind, especially with a starting brake mechanism as just described, is also applicable if, under high requirements as to the torque increase at the time of starting, the change-speed gear 13 to 16 as shown in FIG. 2 should be omitted and only a clutch 7 and a locking device 36 should be provided. This would also be a kind of dog clutch connection in which at least in the starting condition the superimposed gear would operate as a change-speed gear. Also in this case, the new and inventive combination of a superimposed gear with the speed change mechanism proves to be of great advantage since it permits not only the clutch teeth to be relieved of the torque for disengaging the clutch but also the speed of the two shafts and clutch members to be synchronized for engaging the clutch. The automatic operations previously mentioned with reference to gears 13 to 16 for relieving the clutch teeth of the load or for synchronizing the speed may also be applied in a similar manner as with the change-speed gear. If the transmission is limited to a synchronization of the two parts of clutch 7 and to the use of locking teeth 36 as shown in FIG. 2, two fixed pump units or auxiliary hydraulic drive units, respectively would suffice since in the first case it would be necessary to synchronize clutch members 7 and in the other case to stop the movement of gears 15, 16 or of the internal rim gear 9. Obviously, this would simplify the apparatus to some extent.

In place of the axial piston units as illustrated, for example, in FIG. 1, it is also possible to apply hydrostatic drive units of other designs, for example, radial piston drive units. Insofar as such units do not have to be adjustable, it is also possible to apply gear pumps or nonadjustable enclosed drive units. The superimposed gear with the internal rim gear may also be exchanged for similar superimposed gears in which bevel gears are used. The mechanical superimposed gear with the attached hydrostatic drive unit may also be replaced by a hydrostatic coupling of a known type. Finally, the two-speed gear as illustrated may be replaced by any other suitable change-speed gear arrangement. The present invention is also applicable to a change-over arrangement in which it is possible by shifting a suitable clutch mechanism to change from a purely hydrostatic operation at the time when the vehicle starts to move or for maneuvering purposes to a superimposed gear operation for normal high-speed driving. The means according to the invention also permits generally either by manual operation or automatically, to eliminate the torque when releasing clutches of other known types and to synchronize the speed of any gear elements which are to be connected by means of clutches. This eliminates the well known troubles and difficulties which arise when such couplings are disengaged while under load or when they are engaged while their members are not running at equal speeds.

The present invention relates especially to change-speed gears with dog or wheel clutches, particularly since the transmissions which include efficient friction clutches do not require the apparatus according to the invention to carry out the speed changing operation itself, and the application of the hydrostatic superimposed drive mechanism could in such a case only serve to bridge the individual gear stages and to avoid jolts or knocks when shifting from one speed to another. However, for this purpose and for avoiding overloads, and also for utilizing the driving motor or engine more efficiently, the present invention may also be applied to transmissions which are provided with efficient friction clutches.

There are, however, numerous friction clutch transmissions in which the friction values are so finely calculated that they may only be engaged when the speed of the clutch members is synchronized since otherwise they will not engage with each other or may even be ruined. For such transmissions it is possible also to utilize the invention for engaging the clutch with the same advantage as for dog and wheel clutch transmissions which are most frequently used.

In the embodiments of the invention as previously described, the change-speed gear is mounted between the superimposed drive and the driven shaft, as is generally the most suitable arrangement in the case of drives which require a torque intensification. However, in place of or in addition to such a gear it is also possible to interpose a change-speed gear between the driving engine 1 and the superimposed transmission.

FIG. 5 illustrates a transmission in which the respective gear ratios will be attained by selective shifting of dog clutch 7 to engage gears 44, 45 or 46, 47, respectively, which are disposed between the motor or engine 1 and the superimposed gearing. There is also a locking tooth 36 which, however, should not be engaged except when clutch 7 is in its central, neutral position. All of the other parts of the transmission are substantially similar to those illustrated in FIG. 2 and therefore identified by the same reference numerals. The means for disengaging or reengaging the dog clutches or any sliding gear wheels, if those should be provided, may be provided in a manner analogous to that shown in FIGS. 2 to 4. However, it is in this case generally advisable also to utilize drive shaft 2 for synchronizing the speed by means of a sprocket wheel 55 and a chain 56, for example, in connection with the shafts 3 and 4. If shaft 3 with the parts connected thereto should be disconnected at both sides, that is, from shafts 2 and 4, and if all possibilities of attaining an automatic speed change, and particularly a simultaneous shifting of dog clutches 7 and 8 and possibly also of locking tooth 36 should be utilized, it would, however, be necessary to apply two differential gears which also would have to be combined with a drive unit for regulating the speed of shaft 3. If both differential gears should then act upon the drive unit 23' in opposite relation to each other, this would automatically lead to the correct speed adjustment of shaft 3. However, in this case, it would be advisable to apply friction clutches or safety valves to the hydraulic differential in order to avoid damage if temporarily, for example, when the speeds are being changed, these differential gears should act in opposition to each other while shaft 3 is still engaged. The other means previously described with respect to the embodiments according to FIGS. 2 to 4 may also be applied in this case without any considerable changes.

Figure 6:
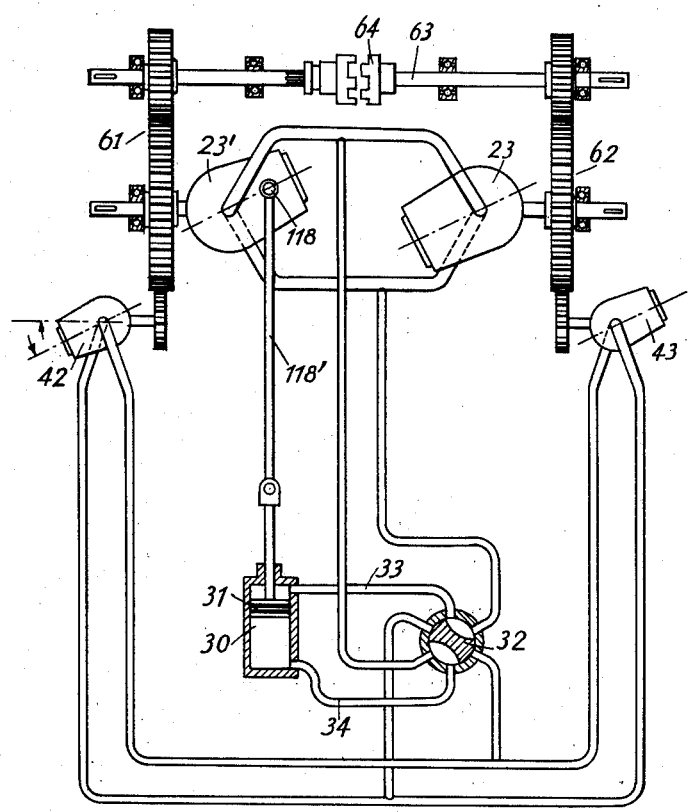
FIG. 6 shows a hydraulic drive which is provided with an intermediate gear and a hydrostatic transmission for controlling the transmission force and torque.

As has already been indicated, the means illustrated in FIGS. 2 to 4 may also be applied in drive mechanisms which do not contain either a gear transmission or a hydrostatic coupling. An embodiment of such a mechanism is illustrated in FIG. 6, in which a pair of hydrostatic drive units 23 and 23' is bridged by two sets of gears 61 and 62 and the shaft 63 which, contrary to the preceding embodiments, is divided and carries the dog clutch 64. The hydrostatic drive units 23 and 23' may be used for relieving the teeth of clutch 64 of the load and may for this purpose be designed so as to transmit the effective torque at least for a short time. This results in the advantage that, when clutch 64 is disengaged, the hydrostatic units 23, 23' can also be used for governing the speed ratio, as well as for synchronizing the speed of the two clutch members prior to their engagement. The actual main drive of this transmission no longer requires any clutch. When changing the speed, there is no interruption of the power output or the torque output. The hydrostatic drive units can at the same time function as governors.

For synchronizing the two clutch members, additional drive units 42 and 43 are provided which control the adjustment of drive unit 23' by means of a valve member 32 in a manner similar as shown in FIG. 4. There is thus also a similar hydraulic connection between the pipe lines of the drive units and a connection to cylinder 30 with a control piston 31 therein. Since piston 31 is connected to drive unit 23' through connecting rod 118' at 118, a shifting of piston 31 within cylinder 30 will control the operation of unit 23'. The auxiliary drive units 42 and 43 will thus serve to synchronize the speed to permit clutch 64 to be engaged, while its disengagement will be attained by being relieved of the torque.

Figure 7:
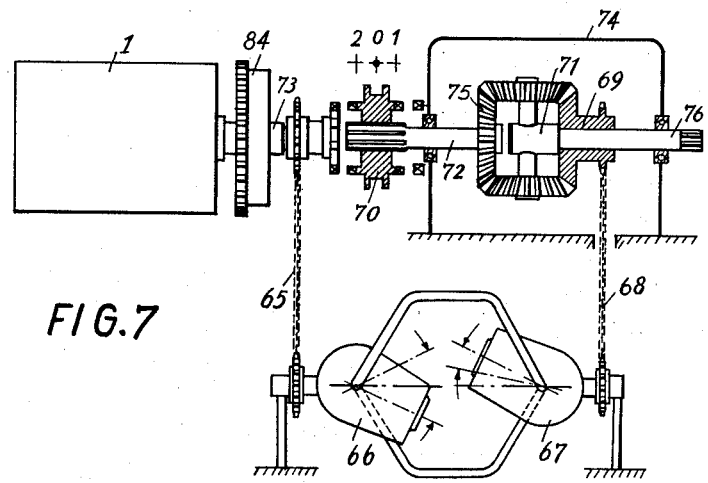
FIG. 7 shows a hydraulic drive with a mechanical planetary gear in which the clutch is superimposed by a hydrostatic transmission unit.
Figure 8:
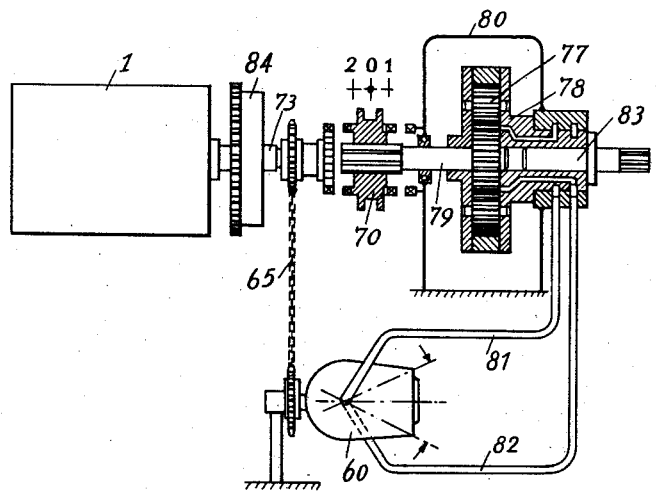
FIG. 8 shows a hydraulic drive with a hydraulic planetary gear in which the clutch is bridged by a hydrostatic transmission unit.

FIGS. 7 and 8 illustrate two embodiments of the invention with differential drives, that is, with a mechanical and a hydraulic differential, respectively. In these transmissions, there are no shiftable intermediate gears. As in the previous embodiments, the motor or engine is designated by 1. In FIG. 7 this engine is connected with the power transmitting shaft of the primary unit 66 of a hydrostatic drive system, for example, through a chain drive 65, while the secondary unit 67 is connected with the differential 69 through a chain 68. Both the primary and secondary units 66 and 67 are adapted to operate either as a pump or as a hydraulic motor. An important feature is the fact that clutch 70 in association with the differential gear 71 permits various speed control combinations. When clutch 70 is in the position 2, shaft 72 will be connected to shaft 73 of engine 1. In the position 0, drive shaft 73 will be in the free-wheeling position, while in the position 1, clutch 70 will be positively locked to the stationary housing 74. When this locking connection is made, gear wheel 75 of the differential which is mounted on shaft 72 is stopped. Regardless of this fact, however, the driven shaft 76 will be rotated since the primary unit 66 of the hydrostatic drive system is connected to shaft 73 of engine 1 through chain 65 or a gear transmission or the like and will therefore also drive the secondary unit 67. Such drive is generally possible in both forward and reverse directions. The driven shaft 76 will then likewise be turned either forwardly or in reverse through the differential gears 75 and 69. This is of advantage particularly if the entire differential drive is so designed that, when clutch 70 is in the position 2, that is, when gear 75 of the differential is driven by engine 1, it will not be possible to stop the driven shaft 76 or even to run in the reverse direction. However, in many cases it is advisable to design the transmission of chain drives 65 and 68 so that only a very specific control range will be covered by means of the differential gear. This control range is generally provided only for the forward movement. The entire hydrostatic drive system 66, 67 may then be made of very small dimensions without danger of being overloaded. As already mentioned, when clutch 70 is in the position 0, gear 75 of the differential is disconnected from engine 1 and engine 1 is freewheeling, while in position 1 gear 75 will be stopped. In the latter case, the driven shaft 76 may rotate either forwardly or in reverse by means of the hydrostatic drive system. This will happen even though the transmission of chain drives 65, 68 is made of such a ratio that the driven shaft 76 will be given only a limited forward or reverse speed through the hydraulic units 66 and 67.

The transmission arrangement according to FIG. 7 is of special advantage when applied to machines, for example, for the manufacture of paper, which primarily require high driving speeds but must also be capable of running slowly, sometimes both forwardly and in reverse, for carrying out certain operations. In paper making machines, this would apply, for example, to the times when paper is to be first inserted into the machine or when repairs are to be made.

While FIG. 7 illustrates the application of a disconnectable differential drive with a mechanical differential gear, FIG. 8 illustrates a similar arrangement with a hydraulic differential. It consists, for example, of a gear pump 77 with a rotary housing 78. This gear pump 77 may be connected through the central gear shaft 79 and a clutch 70 to the motor or engine 1 or be fixed in a stationary position on housing 80. Such a hydraulic differential requires a feed line and a discharge line for the hydraulic oil in the form of oil pipes 81 and 82 which are connected to an adjustable pump 60. This pump will be driven, for example, by engine 1 through a chain drive 65 connected to the power transmitting shaft of hydraulic unit 60. If pump 60 supplies oil under pressure to gear pump 77 in the rotary housing 78, the speed of flywheel 84 will be increased. If, however, gear pump 77 discharges oil, the speed of flywheel 84 will be reduced. The slip produced is then returned without any actual loss to shaft 73 of engine 1 through pump 60, which in this case operates as a hydraulic motor, and through chain drive 65.

FIG. 8 shows that exactly the same results may be attained with the hydraulic differential as with the mechanical differential according to FIG. 7. It is therefore possible to adjust this transmission to produce a low forward and reverse speed, and it is not necessary either to design the hydraulic gear 66 and 67 for a high power output or to design gear pump 77 for high relative speeds of its gears. Consequently, through the possibility of disconnecting the shaft of the differential, the same advantages may be attained as by the disconnectable mechanical differential according to FIG. 7.

After describing the details of the present invention with reference to FIGS. 1 to 8, some of which are diagrammatical, in order to facilitate a clear understanding of the invention, I will now give a description of an actual embodiment thereof which will show that the transmission according to the invention may also be produced in a compact form which may be readily applied in actual practice.

Referring to FIGS. 9 to 13, the numeral 2 again indicates the drive shaft which in a motor vehicle is generally connected to an internal combustion engine, although not necessarily by a releasable clutch, but usually by a slightly flexible coupling, not shown in the drawings, which permits small centering errors to be corrected between drive shaft 2 of the transmission and the engine crank shaft or the main drive shaft of any other prime mover. 202 designates the driven shaft which passes out of the change-speed gear 203 which may be, for example, a two-speed gear. Shaft 205 passing into gear 203 has a gear wheel 204 rigidly secured thereto which is in mesh with a gear wheel 206 on a counter-shaft, the other gear wheel 207 of which is in mesh with gear wheel 208 which is freely rotatable on the driven shaft 202 but may be coupled thereto when the gear shift lever 209 is moved into the hill-climbing position M. For this purpose, the clutch member 210 and the inner end of shaft 202 are provided with a plurality of interengaging splines along which clutch member 210 may be shifted in the axial direction. If, however, gear shift lever 209 is moved from the neutral position 0 to the normal driving position N, clutch member 210 connects the driven shaft 202 to shaft 205 and thereby disengages the two-speed gear so that shaft 202 then runs in the direct drive.

A more detailed description of this two-speed gear will not be necessary since it is designed in conformity with the usual requirements. It may also be replaced by a change-speed gear with more than two speeds. If desired, and if the reversing mechanism which is provided in the hydraulic gear as indicated generally at the left side by G (FIGS. 9, 10, 11) is to be omitted, this gear unit 203 may also be provided with a reverse gear. Furthermore, in place of gear unit 203 it is possible to substitute a change-speed gear of any other suitable design known in the art, for example, a planetary gear. The present invention is therefore not concerned with the particular design of this change-speed gear but only with the hydraulic means which permit this gear to be easily manipulated in the manner as already described in principle with reference to FIGS. 2 to 8.

Generally, it is advisable, especially if the speeds are to be rapidly changed also while driving at a high speed, to install the usual synchronizing clutches on the gear change elements and to make them of better than adequate strength. Evidently, a strong synchronizing clutch has the effect that the automatic elimination of the torque, which according to the invention is produced by a piston operating in a pressure cylinder which effects the adjustment of the hydraulic gears and is responsive to the differences in pressure in the hydraulic pressure circuit, will occur very rapidly. Furthermore, it should be taken into account that minor errors or residual torques will then remain which must be quickly overcome by the synchronizing clutch in order to attain at least approximately the necessary state of synchronism for engaging the dog clutch members.

However, even if no dog clutch members, slide gears, or the like are used and the different gear stages are engaged and disengaged by means of friction clutches, for example, multiple-disk clutches, it will be of great advantage to apply the inventive control of the transmission ratio of the hydraulic gears in accordance with the pressure in the pipe lines of the hydraulic circuit since the action of the torque upon the clutches will thus be considerably reduced during the speed-changing operations. Consequently, the speed-changing operations may be carried out by means of comparatively small friction clutches, for example, small multiple-disk clutches and such clutch can couple the respective shafts while only under a small load. Furthermore, such control considerably facilitates the actual coupling effort. This is of great importance in view of the fact that any friction clutch has the characteristic, usually at a very great extent, that when sliding, it will only be able to transmit very small torques in comparison with those which it can and has to transmit when fully engaged. The invention is therefore also of considerable advantage if the transmission does not have any dog clutches or sliding gears but the speed changes are carried out either by change-speed gear 203 or at the inside of the housing of the hydraulic transmission G by means of friction clutches.

Figure 10:
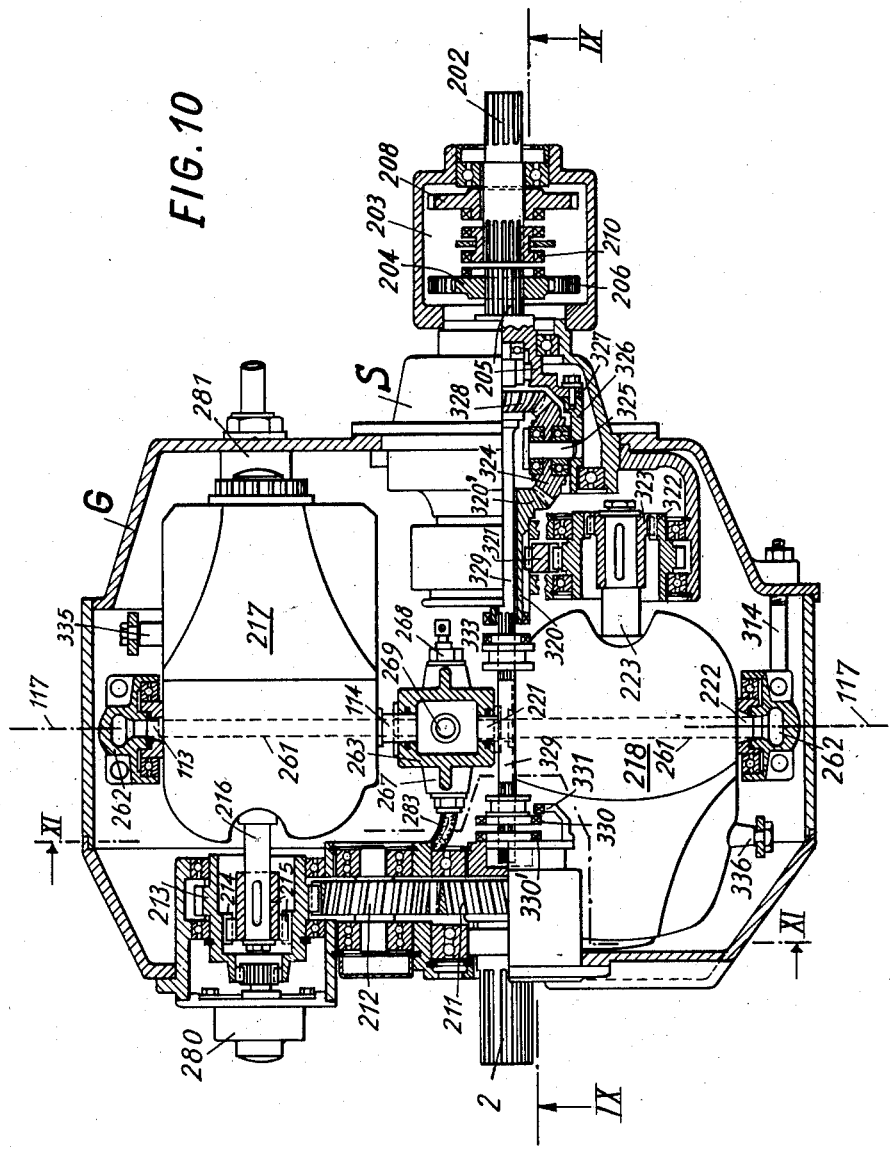
FIG. 10 shows a longitudinal cross section taken in a direction perpendicular to FIG. 9 and illustrates the essential parts as seen from above.
Figure 11:
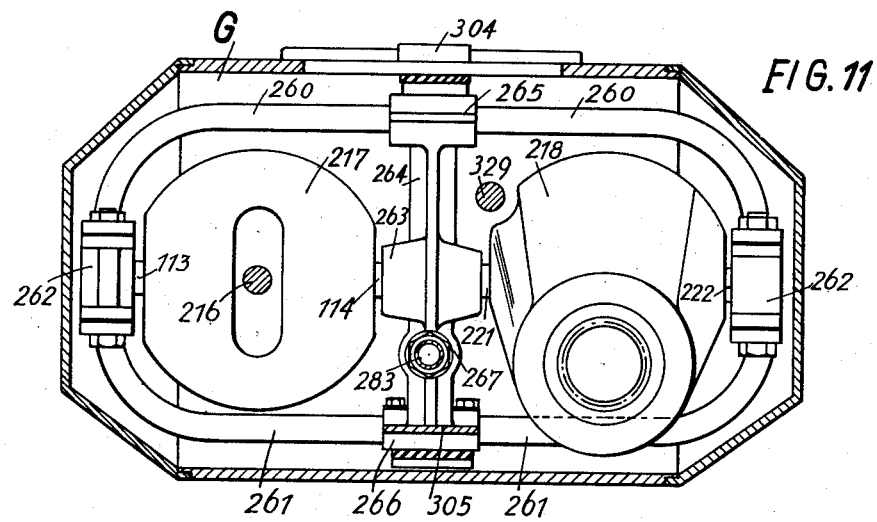
FIG. 11 shows a cross section taken along line XI—XI of FIG. 10.

The hydraulic transmission G is designed as follows:

A spur gear 211 is rigidly secured to drive shaft 2 and always in mesh with a spur gear 212 which, in turn, is in mesh with a gear 213 on the outside of a hollow shaft which is provided with internal gear teeth 214, as shown particularly in FIG. 10. This internal gear 214 engages with a pinion 215 with the same number of gear teeth which, however, are slightly curved and engage with the teeth of gear 214 with a certain amount of backlash. Pinion 215 is rigidly secured to the power transmitting shaft 216 of a hydraulic transmission unit 217 which may be of a design known as such in the prior art as shown, for example, in FIG. 1, or as described in detail in the British Patent No. 684,555 with reference to FIG. 1 thereof. This hydraulic transmission is once more illustrated diagrammatically in FIG. 14 and is an axial piston unit with a shaft 101 and a driving disk 115 which is firmly secured thereto and drives a larger number of pistons 103 through connecting rods 102 which are connected to disk 115 by ball-and-socket joints. Pistons 103 are slidable in cylinders 110 which are combined in the usual manner within a rotary cylindrical drum 104. The pear-shaped housing of the hydraulic unit 217, as well as the adjacent hydraulic unit 218 may be pivoted so that the cylindrical drum 104 may rotate about an axis which extends at an oblique angle to the axis of the drum 104. Pistons 103 within drum 104 will then carry out a reciprocating movement, and by providing valve parts 106 as conventional in axial piston transmissions it is thus possible by the operation of these pistons to convey the hydraulic fluid to the inlet and outlet 114 and 113, respectively. The same applies to the other hydraulic unit 218 in which the inlet and outlet for the hydraulic fluid are designated by 221 and 222.

Although the arrangement of the hydraulic drive units 217 and 218 as illustrated in the drawings has special advantages, hydraulic units of other designs may also be used, particularly those which also operate with pistons and cylinders but do not have any pivotable cylindrical drums but, for example, inclined or pivotable driving rings or any other kind of cylinders, for example, in a radial or inclined position. However, at least one of these hydraulic units should then be designed so that the stroke of its pistons can be adjusted to permit an adjustment of the transmission ratio for the movement of the two power transmitting shafts 101 and 223 without requiring large amounts of oil to be discharged continuously through an outlet or short-circuiting valve, which should be avoided because of the large losses resulting herefrom. The two hydraulic units 217 and 218 are illustrated in the drawings as axial piston drive units having a common pivotal axis 117—117. The pipe connections necessary for the operation of these units are illustrated particularly in FIGS. 11 and 12. They consist of two angularly bent pipes 260 and 261 which, together with two outer bearing members 262, a common cylindrical bearing member 263, and the intermediate supporting member 264 thereof which at the inside contain corresponding bores for connecting the outlets and inlets 113 and 222 (see FIG. 10) with the inside of the two bent pipes 260 and 261, form the supporting structure on which the two units 217 and 218 are pivotably suspended. The central bearing member 263 is suspended by supporting member 264 on the two angular pressure pipes 260 and 261 by means of flanges and bolts 265 and 266. The transmission ratio and the entire combination of the two hydraulic drive units is thus designed in a manner as conventional in hydraulic gear systems.

However, the apparatus may also be designed so that the cylindrical member 263 forms the pressure pipe which is necessary for the more important forward movement. This would result in a more simplified construction of the angular outer pipes 260 and 261 which will then only have to withstand the pressure for the reverse torques which is usually of lower strength.

Figure 9:
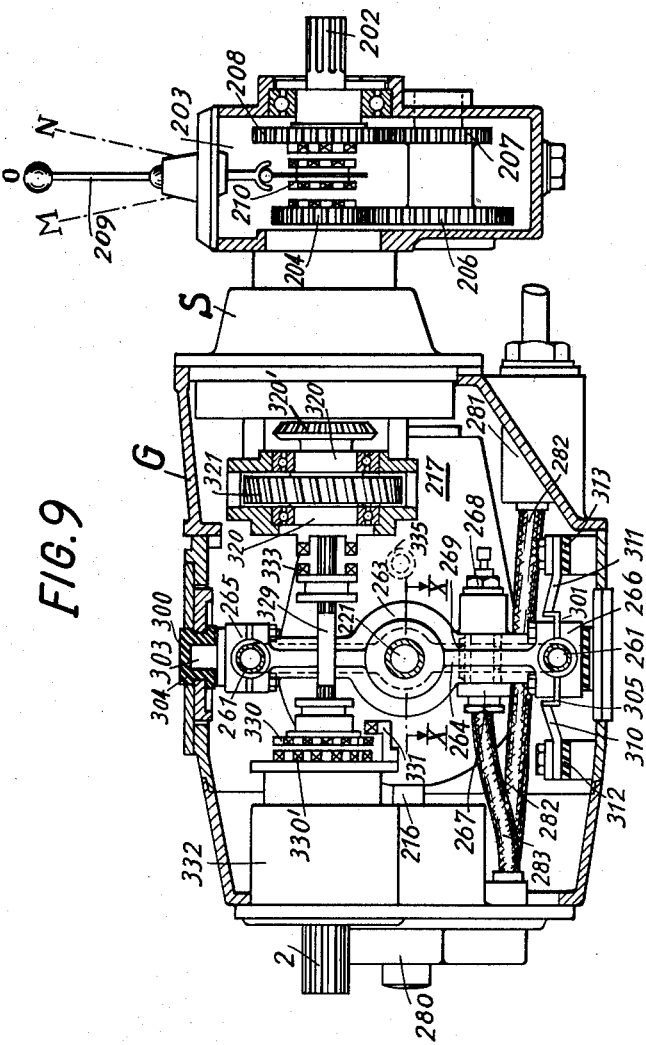
FIG. 9 shows a cross section taken along line IX—IX of FIG. 10 through a transmission according to the invention for illustrating the details of construction thereof.
Figure 13:
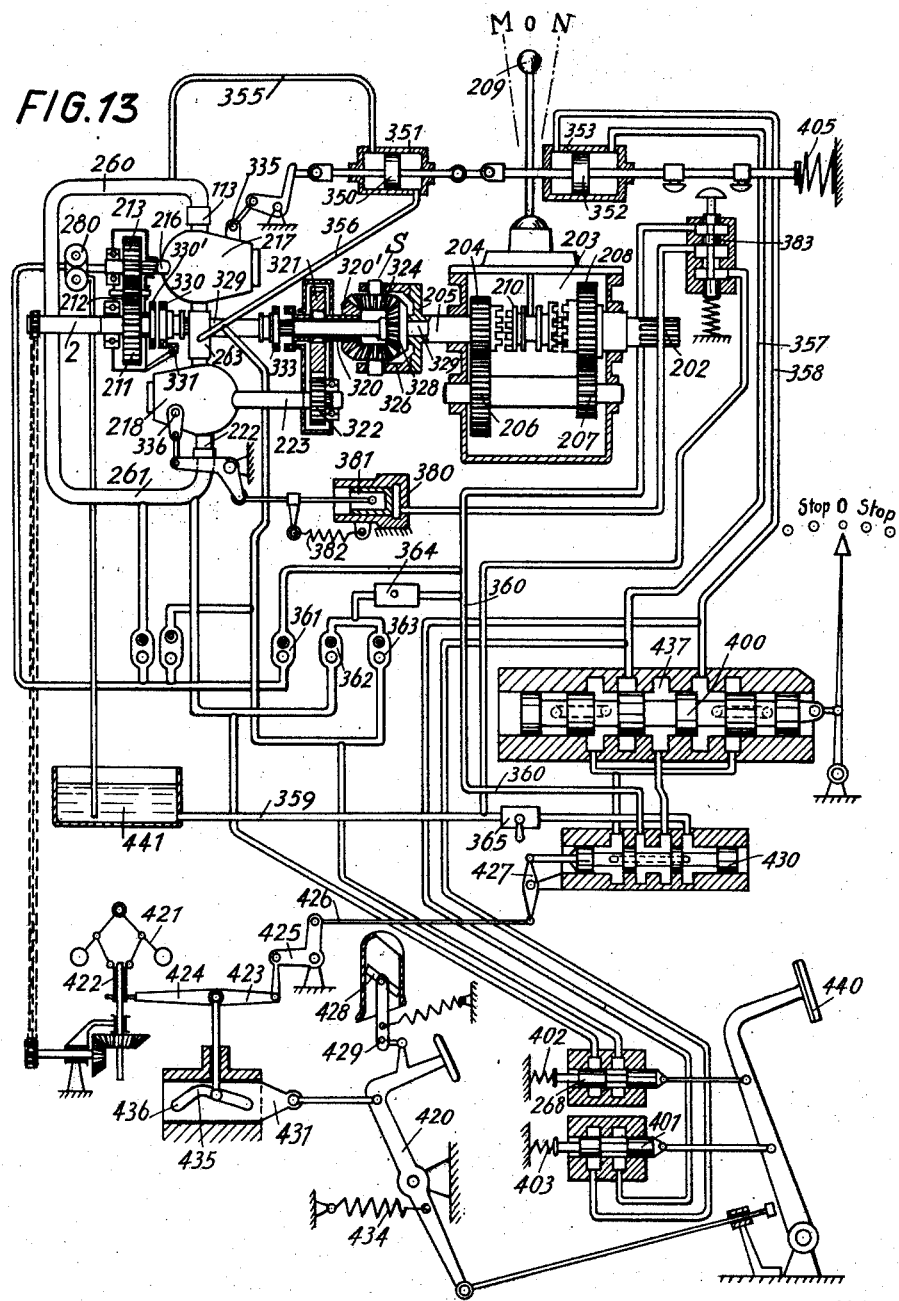

The supporting member 264 which carries the high-pressure connecting cylinder 263 is preferably also provided with a valve body 267 which may serve to supply the feed oil from the feed pump 280, as indicated in FIGS. 9 and 10, which may, for example, be a gear pump and be driven by the internal gear 214. This feed pump 280 draws the oil usually under low pressure from a tank 441, as shown in FIG. 13, through a filter 281 and suction pipe 282, and then through a flexible pipe 283 into valve 267, from which it then flows through suitable passages, one of which is shown at 269, to the pipe connection 356 and then to one or both pressure sides of the cooperating hydraulic units 217 and 218. At the same time, it is also possible to provide at this or a sutiable other point the usual scavenging valves which are known as such and do not need to be particularly described since their purpose and arrangement is generally known. Valve body 267 may further be provided with a declutching valve 268, that is, a short-circuiting valve which connects the high-pressure cylinder 263 with pressure pipes 260 and 261 which are connected at 262. This valve 268 therefore operates in a manner similar to a releasable clutch on drive shaft 2 and thus renders the provision of such clutch usually unnecessary.

It is evident from the arrangement as above described that the two hydraulic drive units may be mounted in a very simple manner within the actual housing G of the hydraulic transmission system. The angular pipe unit 260 and 261 which principally carries the pear-shaped hydraulic units is mounted by means of two rubber-lined pivotal joints 300 and 301 so as to be slightly rotatable about a vertical axis. The upper joint 300 consists of a pin 303 and a rubber socket 304. The lower joint 301 is slightly shorter and consists of an angle ring 305 which centers the tubular frame 260, 261 so as to be rotatable about the same axis. This angle ring 305 is connected by means of flat iron bars 310 and 311 to the rubber-lined brackets 312 and 313 which are directly connected to the wall of housing G.

The adjustment of the pivoting angle of the tubular frame 260, 261 about the vertical axis may be controlled by an adjustable bolt 314, as shown in FIG. 10, whereby the hydraulic units may be pivoted slightly about a vertical axis, particularly in view of the longitudinal movability of clutch pinions 215 and 323 within the hollow shafts 214 and 322 which are provided with inner gear teeth. This longitudinal movability of clutch pinions 215 and 323 permits an adjustment in the compression and expansion of both cooperating piston units of this hydraulic transmission for the purpose of reducing losses and noise in a manner similarly as described in the British Patent No. 684,555. In place of this manually adjustable device 314, it is, however, also possible to carry out the adjustment of the compression automatically, for example, by one or two pistons which are acted upon by the pressure at one or the other side of the transmission and rest against suitable springs, and thus bring about the desired relation between the angle adjustment of the tubular supporting frame 260, 261 about its vertical axis and the operating pressure values in one or both pressure pipe lines. Naturally, it is also possible for this purpose to provide two equal spring-loaded pistons or pistons which effect such compression adjustment indirectly by means of hydraulic auxiliary control means or by other suitable means which are known as such.

It is also necessary to describe the function of hydraulic drive unit 218 which drives the primary shaft 205 at the intake side of change-speed gear 203 by means of an intermediate gear and a superimposed gear set S which operates similar to a differential gear. Power transmitting shaft 223 of drive unit 218 may be connected to the hollow drive shaft 320 of the superimposed gear set S, for example, in a manner similar as described with respect to hydraulic drive unit 217 by means of an intermediate set of gears 321 and 322 and a pinion 323 which is secured to drive shaft 223 and engages with an internal gear in the hollow driving gear 322. This internal gear preferably has the same number of teeth as pinion 323 but engages the same with a certain amount of backlash. The hollow drive shaft 320 of the super-imposed gear set S carries at the right side a bevel gear 320' which engages with one or more planet wheels 324, each of which, in turn, is connected to the revolving body 326 of gear set S by means of a short, radially extending shaft 325. This body 326 is firmly bolted to a flange 327 on shaft 205 of the change-speed gear 203.

Planet wheels 324 are further in engagement with a bevel gear 328 which is secured to a shaft 329. This shaft 329 may be connected either rigidly or with a certain amount of play to the primary shaft 205 of change-speed gear 203 and extends at the other side through the hollow shaft 320 of the superimposed gear set S and to such an extent that a dog clutch member 330 on the left end thereof may be engaged with the corresponding clutch member 330' at the right end of drive shaft 2. Clutch member 330 is slidably mounted on shaft 329, for example, by means of splines, so as to be shiftable from its neutral position as illustrated not only toward the left into engagement with the other clutch member 330' but also toward the right and into engagement with one or more locking teeth 331 which are mounted rigidly on the gear housing 332.

Shaft 329 on which bevel gear 328 is rigidly secured also carries a second clutch member 333 which may be shifted thereon toward the right from the neutral position as illustrated so as to be engaged with a corresponding clutch member on the hollow primary shaft 320 of the superimposed gear set S.

The operation of the arrangement as above described is as follows:

In the position as illustrated in FIGS. 9, 10 and 13, the two clutch members 330 and 333 are entirely disengaged so that shaft 329 can rotate freely. As a result, the forces transmitted by the hydraulic unit 218, as well as those which are transmitted from primary shaft 205 through the bevel gears 328, 324, and 320' to shaft 320, have then practically no resistance. The entire transmission is therefore completely idling, even though a gear might be engaged in the change-speed gear 203. If the dog clutch member 330 is then shifted toward the right into engagement with locking tooth 331, the rotation of shaft 329 and thus also of bevel gear 328 will be stopped. In this position, when the change-speed gear 203 is engaged, it is possible to use the hydraulic unit 218 for driving the vehicle through the superimposed gear set S acting as an intermediate gear to drive shaft 205, and then through the change-speed gear 203. By pivoting drive unit 217, which in this case operates as an oil pump, either upwardly or downwardly by means of a control member 335, it is then possible to drive the vehicle equally in either the forward or reverse directions. This merely requires that also the other hydraulic unit 218, which in this case operates as a hydraulic motor, is likewise pivoted sufficiently by means of its control member 336, for example, to its lowest downward position, as illustrated in the drawings, so that its pistons will operate with their maximum stroke length. Provided that the gear shift lever 209 has been shifted to the position N to engage the direct speed, such adjustment of the transmission will therefore permit the vehicle to be driven either forwardly or in reverse, and generally at a speed approximately one-half of the full speed because of the reduction caused by the superimposed gear set S. On the other hand, it is also possible to engage the hill-climbing gear M whereby the maximum speed will be considerably reduced and the maximum torques for both forward and reverse driving will be transmitted.

Even in this position of the hydraulic units it is possible to disengage the entire hydraulic system by a proper manipulation of the two clutch members 330 and 333, and to produce a direct mechanical drive between the drive shaft or the transmission as a whole and drive shaft 205 of the change-speed gear 203, in which case the latter may be engaged in the direct drive or be geared down or, if desired, be in the neutral position. It is then only necessary to accelerate the vehicle or the driven shaft 202 in the manner as described to such an extent that the direct drive can be engaged in the hydraulic unit either in the geared-down position of the change-speed gear or in the direct drive thereof. If the required torque is not too high, such operation will be possible by a corresponding adjustment of the other hydraulic unit to a smaller stroke length when unit 217 is pivoted far outwardly and then operates as an oil pump when the vehicle is driven, or through the throttled hydraulic motor when the vehicle is decelerated. After the vehicle has in this manner attained an adequate speed, clutch member 330 should first be shifted to the neutral position. This may be done in the manner described in the beginning by operating the adjusting mechanisms of the two hydraulic units or by operating the short-circuiting valve 268. In order to disconnect the hydraulic system entirely, it is then first necessary to shift clutch member 330 toward the left and into engagement with drive shaft 2. This will be made possible in the manner described in the beginning by adjusting the stroke of the hydraulic units 217 and 218 so that the clutch members to be engaged will not have any or only a low relative speed, and usually by again closing the short-circuiting valve 268. If the two clutch members run substantially synchronously, they may then be engaged without noise and wear. The actual clutching operation may be carried out by a clutch pedal 440, as shown in FIG. 13, which will be later described. After such engagement of clutch 330, the stroke of the hydraulic units 217 and 218 may then be adjusted so that clutch member 333 will also run substantially synchronously with the hollow shaft 320 of the superimposed gear set S. Thereupon, the latter may likewise be engaged, possibly by the same means as above described, so that drive shaft 2 of the transmission will be directly connected to the drive shaft 205 of the change-speed gear 203, in which case the superimposed gear set S will rotate as a block with all of its internal parts being at a standstill relative to each other. The hydraulic units may then, as above described, be released of any pressure; they may also be adjusted to a smaller stroke or the stroke may be set to zero, and the friction at the valve surfaces thereof may be eliminated by auxiliary means as later described.

However, it is also possible to start the movement of the vehicle in a manner as above described, but with clutch member 330 already being shifted toward the left into engagement with clutch member 330'. In order to engage this clutch without difficulty while the vehicle is fully stopped, it is only necessary to make the transmission ratio between shafts 216 and 223 of the hydraulic units of such a size that the relative speed of clutch members 330 will be low. This, however, requires that hydraulic unit 218 will run in the reverse direction and, as will be seen from the operation of the superimposed gear set S, possibly even at a rather high speed. This is always possible provided the driving engine and thus also the main drive shaft 2 are not required in this operation to run at the maximum speed. Clutch members 330 and 330' may then be engaged even while the vehicle is standing still. However, for driving the vehicle in reverse, it is then necessary to adjust hydraulic unit 218 so as to run at a still greater speed in reverse. Since this is generally not desirable, especially because such a fast reverse rotation can usually be attained only with a small piston stroke of unit 218, the reverse drive of the vehicle will preferably be engaged by the first mentioned method or by providing a reverse gear in the change-speed gear. The forward acceleration of the vehicle is, however, easily possible in this manner since the hydraulic unit 218 which runs in reverse and operates, so to speak, as a hydraulic motor, only needs to be retarded which will reduce its speed as desired. As described in the beginning, this may also be attained by the use of a mechanical brake which acts upon shaft 223, particularly if the hydraulic unit should in this kind of a start be protected from an excessive load. This brake mechanism is, however, usually unnecessary and therefore not illustrated in this particular embodiment of the invention. The rotation of unit 218 may be further retarded, for example, up to its complete stop, by reducing the stroke of unit 217, for example, to zero. It may then be run in the forward direction, while the transmission of the entire hydraulic superimposed drive will be further reduced. This may be carried out to such an extent that the main drive shaft 2 rotates fully synchronously with drive shaft 205 of the change-speed gear. In that case, clutch member 333 may also be shifted toward the right to engage shaft 329 with the hollow shaft 320 so that the direct mechanical drive will be established between the main drive shaft 2 and the drive shaft 205 of the change-speed gear which may then be engaged either in the direct drive, in the climbing gear, or, if provided, in the reverse gear.

If the climbing gear is engaged and a certain driving speed has been reached, it is also possible, as described in the beginning, to shift from the reduction gear of the change-speed gear to the direct drive or vice versa. The advantage of the combination of a hydraulic transmission, particularly in the superimposed gear arrangement, with a mechanical change-speed gear as described in detail in the beginning will thus be quite evident.

If both clutches 330 and 333 are shifted simultaneously toward the right, the rotation of shaft 329 will be prevented and this shaft will also be coupled to the hollow primary shaft 320 of the superimposed gear set S and bevel gear 320' thereon. The body 326 of this gear will then likewise be prevented from rotating and, if clutch 203 is likewise thrown into gear, the driven shaft 202 of the entire transmission will also be locked. Such mechanical locking of the driven shaft 202 is often desired when the vehicle is parked.

If desired, the mentioned clutch members may also be provided with synchronizing means or, if there is sufficient space, they may also be made in the form of friction or multiple-disk clutches. Generally, however, this will only be necessary for the change-speed gear 203 since when the latter is provided, the speed changing elements in the hydraulic transmission housing will seldom be operated. All of these elements in the transmission housing may also be omitted if shaft 329 is rigidly and permanently coupled to drive shaft 2, and a reverse rotation is provided either by the hydraulic means as described or by means of a special reverse gear in change-speed gear 203. A purely hydraulic forward and reverse drive without any speed change is, however, desirable only in vehicles designed for special purposes.

After the general details of construction of the transmission according to the invention have thus been described, it may also be necessary to describe the hydraulic system as a whole and its connections with reference to the diagram shown in FIG. 13 in order to illustrate clearly at least one of the many possible embodiments of such a transmission.

Since in this diagram according to FIG. 13, numerous parts are identified by the same reference numerals as in FIGS. 9 to 12, it will not be necessary to describe those parts again in detail but only the parts of the actual hydraulic system which for reasons of clarity were not illustrated in FIGS. 9 to 12 and which will be more easily understood by reference to a diagrammatic illustration.

As seen in FIG. 13, the main drive shaft 2 drives the hydraulic unit 217 through the intermediate gears 211, 212, 213. Unit 217 supplies the other hydraulic unit 218 with oil under pressure through the short high-pressure pipe 263 which usually is actually under a high pressure when a forward torque is transmitted in the operation of the vehicle. However, the second pipe line 260, 261, whch is here shown as a simple tubular rectangular frame, carries a high pressure only when reverse torques are transmitted. FIG. 13 further illustrates the clutch 330 which is adapted to be engaged to connect shaft 329 carrying bevel gear 328 with drive shaft 2. This shaft 329 may, however, also be locked by means of locking teeth 331, while by means of clutch 333 it may also be connected to bevel gear 320' as required when driving with a direct drive, all as previously described.

These, aside from the change-speed gear 203 with the gear shift lever 209, are the principal parts of the actual transmission. The following description will illustrate one preferred embodiment of the control mechanism for operating this transmission.

The control member 335 which is used for adjusting the size and direction of the piston strokes in the hydraulic unit 217 is connected to a hydraulic piston 350 which is slidable with a tight fit in a cylinder 351. It will not need any special description to understand that all double-acting pistons, for example, the second piston 352 in the cylinder 353 which is likewise actuated for moving unit 217, may be replaced by two single-acting pistons, a rotary gate mechanism, or other suitable means of a known type.

The two sides of cylinder 351 are connected through high-pressure pipes 355 and 356 to the main pressure pipes 260, 261, and 263, respectively, of the two cooperating drive units 217 and 218. Since in this particular embodiment of the invention there is no valve mechanism provided, which, however, may be easily installed, for example, for disconnecting the hydraulic mechanism and for operating the speed control mechanism by hand or in any other manner, the system as illustrated operates in such a manner that the servomotor piston 350 always tends to adjust the drive unit 217 so as to prevent any pressure difference between the main pressure pipes 260, 261, and 263. In other words, this piston 350 tends to maintain the transmission in the idling position and to eliminate the driving torques at the primary shaft 205 of the change-speed gear and thus also at the main driven shaft 202. This, however, presupposes that the second cylinder 353 with its piston 352 will not be exposed to any considerable pressure. This will be attained by designing the main distributing slide valve 400 so that in its central position the two pipe lines 357 and 358 leading to cylinder 353 will communicate with each other. In this position of control valve 400, piston 350 will therefore produce a pressureless condition of the hydraulic transmission, at least insofar as this is possible in view of the pivotal back-and-forth movement especially of the hydraulic unit 217.

In order to achieve the desired starting movement of the vehicle, as described in principle in the first part hereof, it is necessary to shift the main control piston 400 from its central position toward the right or left, depending upon whether the vehicle is to start driving forwardly or in reverse. If valve piston 400 is shifted only slightly, one of the two intermediate positions marked "Stop" will at first be reached. In this position, the two pipe lines 357 and 358 leading to cylinder 353 will be shut off completely, providing at least that the clutch pedal 440 is not depressed and clutch valves 268 and 401 are closed by the action of springs 402 and 403. If the main control piston 400 is further shifted, it will be seen from FIG. 13 that, depending upon the direction of shifting, one of the two lines 357 and 358 will be connected with the drain pipe 359, while the other will be connected with the pressure feed line 360 which is supplied with oil under pressure through three check valves 361, 362, and 363. The first valve 361 is connected with feed pump 280 and, although it therefore never carries a high pressure, it does carry a pressure which, if the cylinders are of adequate size and particularly if piston 352 is made larger than piston 350, is sufficient to permit a pivoting movement of hydraulic drive unit 217 at least when there is no high pressure in the transmission. However, as soon as a high pressure occurs in one of the high-pressure lines 260 to 263, one of the check valves 362 and 363 will open, while check valve 361 will block the entry of the high pressure into feed pump 280. The high pressure is therefore available for passage through high-pressure line 360 to the main control piston 400. However, it must also pass through a flow control valve 364, the details of which do not need to be described since it is of the same type as described in U.S. Patent No. 2,291,011 with reference to FIG. 4 thereof. This valve will, even when under high pressure, only permit the passage of a certain quantity of oil which, if desired, may also be adjustable by the manipulation of a handle. At a sudden occurrence of high pressure, it will prevent a too sudden impact upon drive unit 217 and thus a faulty adjustment thereof. The hydraulic control as above describd therefore permits drive unit 217 to be pivoted either forwardly or backwardly as desired so as to move the same either to one of its two end positions or to stop it in any intermediate position if the main servo-piston 400 is returned at the proper time to one of its two stop positions. It is thus possible to start either the forward or reverse movement of the other drive unit 218 whenever desired and even under a certain load.

For attaining a sufficient rotary speed of drive unit 218, it may, however, become necessary to adjust this unit to a smaller stroke. For this purpose, the invention further provides a pressure cylinder 380 with a piston 381 which controls the adjustment of drive unit 218. A spring 382 or any other suitable hydraulic or mechanical means insures a return of piston 381 in the event that drive unit 218 again is to be adjusted to a larger stroke. The control valve 383 necessary for this purpose is designed so as to supply pressure oil from pressure line 360 to cylinder 380 whenever pistons 350 and 352 are near their two end positions.

In some cases it is also desirable to provide an automatic control of the transmission in response to the speed of the engine and possibly also in response to the adjustment of the engine torque by the accelerator or gas pedal 420, for example, also for the purpose of reducing the transmission ratio automatically when the vehicle starts driving uphill or for preventing the transmission ratio from increasing too quickly at the start which would reduce the engine speed at too great an extent. For this purpose, a centrifugal governor 421 is provided which is driven by the main drive shaft 2 of the transmission or by the engine itself. If the speed of this governor is no longer sufficient, sleeve 422 thereof is lowered so that, if the position of point 423 on the three-armed lever 424 does not change, slide valve 430 will be shifted by means of the connecting members 425, 426, and 427 which are illustrated diagrammatically. This, in turn, prevents any further adjustment of piston 352 and thus also of drive unit 217, and possibly also of drive unit 218. If the engine speed further decreases, even the pressure oil from the central chamber 437 of the cylinder of servo-piston 400 will be drained into oil tank 441. The pressure oil line leading to the cylinder of piston 352 will thus be completely interrupted, and the high pressure in cylinder 351 may then pivot drive unit 217 so far back that the necessary speed of drive shaft 2 will be reestablished.

The entire mechanism just described therefore functions as a speed governor which operates especially when the speed of the drive shaft drops below a certain value and reestablishes such speed, for example, when the vehicle starts to drive uphill. The speed-setting at which slide valve 430 starts to act is preferably made adjustable in accordance with the load on the engine. The invention therefore includes the provision of a cam slide 431 which is adjustable by the gas pedal 420 so that the position of point 423 on lever 424 will be dependent upon the torque development of the engine. This dependency is preferably designed so that, when throttle valve 428 is partly closed, the maximum speed of the engine will be considerably reduced so that the pressure oil which flows from pipe line 360 into slide valve 430 will not be prevented from entering into cylinder 353 which effects the pivoting of the drive unit. Cam 435 is preferably designed so that insofar as the available transmission ratios will permit, the limitation of the engine speed will reach its maximum when throttle valve 428 is closed. This mechanism is so designed that, when the throttle is closed and gas pedal 420 is further released, linkage 429 will open, and the gas pedal will then move further backward under the action of spring 434 and thereby shift cam slide 431 so that the point of engagement of the third arm of lever 424 with cam 435 will be beyond the peak of the cam. At this point, and particularly when the end 436 of the cam is reached, the engine will again be adjusted to a higher speed. It is the purpose of this mechanism, when the engine is throttled down, to be able to increase its speed and thereby to produce a strong brake action while the engine is running idle. This considerably increases the safety of operation and saves the mechanical brakes of the vehicle. Obviously, point 436 of the cam will be disposed in such a position that the speed of the idling engine will never reach any dangerous limits.

The clutch pedal 440 is connected to two valves or slides 268 and 401. The two valves are superimposed to each other in such a relation to each other that, when clutch pedal 440 is depressed, valve 401 will open first. This produces an equal pressure at both sides of piston 352 in cylinder 353 with the result that the pivotal adjustment of drive unit 217 and thus also of drive unit 218 will be influenced to such an extent that the differential pressure in the two main pressure lines 263 and 260, 261 will be eliminated or reduced, at least insofar as this is possible by the adjustment of the drive units. If clutch pedal 440 is further depressed, valve 268 will also be opened. This is a short-circuiting valve which also produces a connection between the two mentioned main pressure lines of the hydraulic system. If the adjustment of the drive units itself should not have been able to attain a sufficient limitation of the pressure and thus a complete elimination of the torque in the hydraulic transmission to permit the clutch shifting operations to be carried out, such short-circuiting operation will further limit the torque development, at least insofar as this is possible by a connection between the main pressure lines. This successive action of the two valves 401 and 268 upon the pressure development of the hydraulic transmission is of special advantage for attaining an easy and noiseless engagement of the main drive shaft 2 with clutch 330, especially also when the vehicle is standing still. It is for this purpose necessary first to shift the main control slide or servo-piston 400 toward the left in the direction for the reverse rotation since, due to the characteristics of the superimposed gear, shaft 223 of drive unit 218 must run in reverse at a rather high speed. If the complete synchronism of clutch 330 with drive shaft 2 is still not attained in this manner, they may still be engaged with each other by a quick depression of the clutch pedal, provided the engine and thus also shaft 2 run slowly. If a gear is engaged in change-speed gear 203 or no change-speed gear is provided and the clutch pedal is then released, the vehicle will start to move, and as long as the clutch pedal is only partly released, it will drive at an adjustment of the hydraulic transmission in which drive unit 218 runs as fast as possible in reverse and, only insofar as this might still be necessary, at a temporary withdrawal of pressure oil by the declutching valve 268.

The hydraulic system further includes a second flow control valve 365 for limiting the quantity of oil discharged from the control mechanism. This is necessary since, if during the starting movement of the vehicle gas pedal 420 is released and the driving force of the engine is thus eliminated and the vehicle is then braked by the engine, the other flow control valve 364 would evidently not be sufficient to prevent undesirably fast movements of pistons 350 and 352 and thus of the hydraulic drive units. In such a case, because of the brake action of the engine, the force which acts upon piston 350 will reverse its direction so that the speed-changing operation will proceed quickly even though only a limited amount of oil is added from pressure line 360. It is therefore advisable in this case to limit the oil quantity discharged from the control units by providing the flow control valve 365. This oil quantity may be separately controlled or adjusted, for example, by making it slightly greater than the one which is supplied by flow control valve 364. It is thus possible to avoid any undesirable reaction of the second flow control valve 365 upon the first valve 364 during a normal starting of the vehicle with a forward driving engine.

In the flow diagram as illustrated in FIG. 13 it is further assumed that the engine is a spark-ignition engine which is controlled by throttle valve 428. In the case of a diesel engine, there are usually no throttle valves but adjustable fuel injection pumps which generally contain one or more speed governors which become operative if the engine speed is either too low or too high. This speed may, by a suitable adjustment of governor 421 be determined so that the operation of the present transmission and control system may also be carried out substantially without change on a diesel-driven vehicle. It is then only necessary to provide the usual adjusting means on the fuel pumps in place of throttle valve 428, and on the control and regulating means usual in such cases.

There still remains one mechanism to be described which serves the purpose of overcoming the disadvantage of the above-mentioned transmission that, although when the direct mechanical drive is engaged it is possible to eliminate or reduce the operating pressure as well as the oil delivery in the running hydraulic drive units 217 and 218, the disadvantage must be taken into account that the usual valve surfaces might run at a high speed and for a long time along each other and thus entail unnecessary friction and wear.

Figure 14:
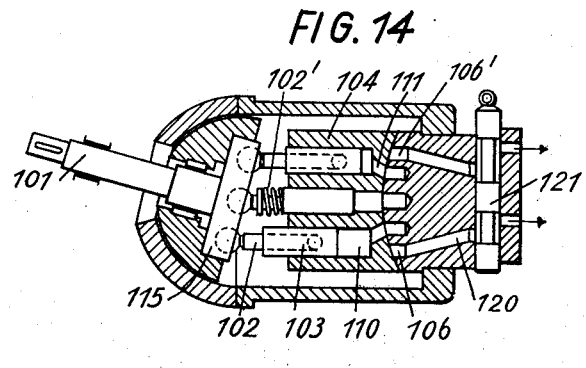
FIG. 14 shows diagrammatically a cross section of a hydrostatic drive unit similarly as illustrated in FIG. 1.

According to the present invention, this may be prevented by the provision of a mechanism which will be actuated when the direct drive has been engaged so as to disturb the state of hydraulic equilibrium at the valve surfaces in such a manner that these surfaces will be lifted from each other or that at least an unusually thick oil coating will be produced between them which will be reduced to a normal limit when the hydraulic drive again starts to operate since a proper operation of the transmission would otherwise be impossible. Such a mechanism is illustrated in FIG. 14 on an axial piston unit corresponding to FIG. 1, and the same is applicable to most axial piston transmissions, and especially to those of the type as illustrated in FIG. 1 of the British Patent No. 625,655. In most axial piston units, the rotating cylinder block 104 is not pressed upon the stationary control surface 106 by any rigid means since it is inadvisable to do so because the distance between the two control surfaces or the thickness of the oil film thereon may in a good axial piston unit not be larger than about $\frac{1}{1000}$ of an inch and because it is very difficult to maintain such a fixed adjustment, for example, by means of a ball thrust bearing. Therefore, the control surfaces are generally held in a tightly sealing contact with each other by means of hydraulic forces, sometimes supported by spring action. The object of the invention of increasing this oil coating and of lifting the control surfaces off each other to some extent may be attained by increasing the extent of the area of the oil pressure between the sealing control surfaces beyond that necessary during the operation. It is known, for example, that the cylinder ports 111 and the corresponding sealing surfaces at both sides should only have limited sizes since otherwise the high pressure would force the control surfaces apart even though a spring 102' might tend to prevent this. For this reason, certain parts of the valve surfaces, especially the outer edge, are frequently separated from the other parts by an annular groove 106' which is connected by channels 120 to the outer atmosphere or at least to a point of reduced oil pressure. Such channels are in many cases also provided within the rotating cylindrical body 104. If such channels are provided in the stationary part, as illustrated in FIG. 14, it is easily possible to provide suitable valves or slides 121 which may be used to close these apertures whenever desired. If such a valve or the like, which does not even have to be built to withstand high pressure, is closed, the leakage oil dripping off the rotating sealing surface dams up in channels 120 so that an overpressure is formed therein. This overpressure interferes with the state of equilibrium of the valve surfaces and separates the same in the manner as described so that the oil coating will accordingly be enlarged, possibly even to such an extent that the entire available oil quantity as supplied, for example, by feed pump 280 as shown in FIG. 9, will emerge at this point.

In accordance with the invention, to overcome the obnoxious friction at the valve surface it is merely necessary to provide valves or other shut-off means which dam up the leakage oil and thereby lift the cylinder block 104 from the stationary valve surface. It is also possible to insert additional pressure oil into channels 120, for example, the feed pressure or pressure from pipe line 360 in FIG. 13, whereby the separation of the control surfaces will be accelerated. It has been found that, in order to overcome the friction and also to eliminate the wear entirely, a relatively small enlargement of the thickness of the oil coating or of the distance between the rotating surfaces of about $\frac{1}{1000}$ of an inch will be fully sufficient. The mechanism is also simplified due to the fact that it only has to be designed for relatively low pressures, that it can therefore be equipped with flexible tubes and similar simple means, and that the details of the valve arrangement are of no significance. However, it may, for example, be desirable to combine these means for eliminating the friction and wear at the parts of the drive units which are rotating at high speeds with the means for engaging and disengaging the direct drive so that they will not be operated until after the direct drive has actually been engaged and not be disconnected before the direct drive is disengaged.

This mechanism is dependent upon the details of the construction of the particular hydraulic drive units only to the extent that there must be valve parts which must be capable of being slightly lifted from one another or in which the thickness of the oil coating is adjustable, as is true in all axial piston drive units even including those with flat control surfaces. The same may, however, also be attained in radial piston units with flat or spherical valve surfaces.

The apparatus as described therefore permits after the direct drive has been engaged to eliminate all noticeable losses and wear despite the rotation of the parts of the hydraulic transmission in the position for the direct drive, that is, the losses in the oil flow and the friction of the pistons by allowing the adjustment of small piston strokes, and furthermore also the friction and wear at the valve surfaces by increasing the thickness of the oil coating or by lifting the valve surfaces from each other by hydraulic or mechanical means. Although evidently it would also be possible to disconnect the parts of the drive units which are running at a high speed by suitable clutches, this would, however, be rather difficult and complicated, and the reengagement of these parts could not be carried out quickly enough since it would require a certain length of time to attain the necessary rotary speeds of the hydraulic units, whereas the hydraulic adjustments as described, namely, the reduction of the thickness of the oil coating and the readjustment of the desired piston strokes may be carried out within a very short time.

In the hydraulic system as illustrated in FIG. 13, the supply of oil to the hydraulic transmission is carried out by the three check valves 361, 362, and 363 from the pressure line of feed pump 280 and by the withdrawal of pressure from the main pressure lines of the transmission.

It is also possible to design hydraulic servo-motors which are supplied with oil by a separate pump or by means of a hydraulic accumulator.

In place of the oil pressure cylinder 353, it is also possible to apply other kinds of impulse transmitters, for example, compressed air, or electrical means of a known kind, or electromagnets with a linear or rotary movement.

The control system consisting of the double-acting pressure cylinders 351 and 353 or of the respective number of single-acting cylinders which cooperate with each other may also be of small dimensions and designed for small forces and movements if suitable magnifying or translating means of any known design be interposed to connect the same to the adjusting points, for example, 335, on the drive units. Such means may consist, for example, of a hydraulic servo-motor or an electric servo-motor, that is, for example, an electric motor which is connected in a known manner so as to operate in response to the preceding control mechanism of cylinders 351 and 353 and the auxiliary devices as described, and to magnify the movements of these means at a certain ratio to produce the required power and stroke length.

The two cooperating pistons and cylinders 350 to 353 may also be replaced by rotating hydraulic motors or pumps without any substantial alteration in their effect.

Furthermore, the above-mentioned cooperating hydraulic cylinders or machines may also be provided with a spring 405 of a suitable strength. This is advisable especially if cylinder 353 should be operated with compressed air because, since air is an elastic medium, the responsiveness of the stroke adjustment of this cylinder to the actuation of the main control valve 400, which in this case would be designed for compressed air, might not be sufficiently reliable if not supported by such a spring.

The above description relates to the cooperation of two hydraulic drive units 217 and 218 with a change-speed gear 203 and the control means thereof. However, it is evidently also possible to subdivide the output of the individual driving parts of the transmission, in which case at least one of the drive units should be provided with an adjustable stroke. The combination and cooperation of the mentioned devices in accordance with the present invention may be attained by means of any suitable hydraulic drive units of a known design, and it is immaterial whether two or more such drive units cooperate with each other, provided, however, that they are so combined as to attain the results as herein described.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A transmission interposed between a prime mover and a driven shaft comprising in combination, at least one releasable coupling having a driving and a driven member, a first hydrostatic drive unit having a rotary power transmitting part drivingly connected to said prime mover, a second hydrostatic drive unit having a rotary power transmitting part, means to hydraulically interconnect said first and said second hydrostatic units, the rotary power transmitting part of said second unit being mechanically connectable to said driven shaft via said coupling, and hydraulic control means acting upon at least one of said units in dependance upon the difference in speed of said two coupling members for their synchronization.

2. A transmission adapted to be interposed between a power supply shaft and a power delivery shaft comprising in combination, a multi-range ratio change speed gear, a coupling operatively connected to said power supply shaft having two driving members for selectively engaging one of two driven members operatively connected through gears to said power delivery shaft, a first hydrostatic drive unit having a rotary power transmitting shaft operatively connected to the driving members of said coupling, a second hydrostatic drive unit having a rotary power transmitting shaft operatively connected to the driven member of said coupling, conduits hydraulically interconnecting said first and second hydrostatic units, and control means operated in accordance with the difference in speed of said two coupling members and acting upon at least one of said hydrostatic drive units for controlling the torque acting between said second unit and said driving members of said coupling.

3. A transmission according to claim 2, comprising a third hydrostatic unit acting also upon said driving members of said coupling.

4. A transmission according to claim 2, comprising a cylinder, a piston slidable in said cylinder and operatively connected to said control means, said piston being acted upon by pressure in said interconnecting conduits.

5. A transmission adapted to be interposed between a power supply shaft and a power delivery shaft comprising in combination, a multi-ratio change speed gear, a coupling operatively connected to said power supply shaft having two driving members for selectively engaging one of two driven members operatively connected through gears to said power delivery shaft, a first hydrostatic drive unit having a rotary power transmitting a shaft operatively connected to the driving members of said coupling, a second hydrostatic drive unit having a rotary power transmitting shaft operatively connected to the driven members of said coupling, conduits hydraulically interconnecting said first and second hydrostatic units, sensing means producing an output dependent upon the difference in speed of said two coupling members and the speed of a disengaged driven coupling member and means to control the output speed of said second hydrostatic drive unit in accordance with said output.

6. A transmission according to claim 5, in which said sensing means comprises a hydrostatic sensing unit drivingly connected to said driving members of said coupling, a second hydrostatic sensing unit drivingly connected to said power delivery shaft and means to hydraulically interconnect said sensing units, said control means comprising a cylinder, a piston slidable in said cylinder and operatively connected to one of said first and said second hydrostatic units, and means to hydraulically connect said hydrostatic sensing units to said cylinder.

7. A transmission according to claim 5, in which said sensing means comprises a hydrostatic sensing unit drivingly connected to said driving members of said coupling, a second hydrostatic sensing unit drivingly connected to said power delivery shaft and means to hydraulically interconnect said sensing units, said control means comprising a cylinder, a piston slidable in said cylinder and operatively connected to one of said first and said second hydrostatic units, means to hydraulically connect said hydrostatic sensing units to said cylinder and selector means to disconnect said cylinder from said hydrostatic sensing units and to hydraulically connect said first and said second hydrostatic drive units to said cylinder.

8. A transmission adapted to be interposed between a power supply shaft and a power delivery shaft comprising in combination, a multi-ratio change speed gear, a coupling operatively connected to said power supply shaft having two driving members for selectively engaging one of two driven members operatively connected through gears to said power delivery shaft, a first hydrostatic drive unit having a rotary power transmitting shaft operatively connected to the driving members of said coupling and having an inlet and an outlet, a second hydrostatic drive unit having a rotary power transmitting shaft operatively connected to the driven member of said coupling and having an inlet and an outlet, at least one of said hydrostatic drive units having means for varying the volume per revolution thereof, a first conduit means connecting the inlet of said first hydrostatic drive unit to the outlet of said second hydrostatic drive unit, second conduit means to connect the outlet of the first hydrostatic drive unit to the inlet of the second hydrostatic drive unit, a cylinder, a piston slidable in said cylinder and connected to operate the volume varying means of said at least one of said hydrostatic drive units and conduit means connecting said first and second conduit means to said cylinder for actuating said piston.

9. A transmission according to claim 5 in which said second hydrostatic drive unit has means for varying the volume per revolution thereof and in which said control means controls the volume varying means of said second hydrostatic drive unit.

10. A transmission according to claim 8 in which said control means controls the output per revolution of said at least one of said hydrostatic drive units in such a manner as to produce a predetermined pressure differential between said first and said second conduit means.

11. A transmission according to claim 8 in which said control means controls the output per revolution of said at least one of said hydrostatic drive units in such a manner as to produce a zero pressure difference between said first and said second conduit means.

12. A transmission adapted to be interposed between a power supply shaft and a power delivery shaft comprising, in combination, a change speed gear, a coupling having a driving member operatively connected to said power supply shaft and a driven member connected to said power delivery shaft, a first hydrostatic drive unit having a rotary power transmitting shaft operatively connected to the driving member of said coupling and having an inlet and an outlet, a second hydrostatic drive unit having a rotary power transmitting shaft operatively connected to the driven member of said coupling and having an inlet and an outlet, at least one of said hydrostatic drive units having means for varying the volume per revolution thereof, first conduit means connecting the inlet of said first hydrostatic drive unit to the outlet of said second hydrostatic drive unit, second conduit means to connect the outlet of the first hydrostatic drive unit to the inlet of the second hydrostatic drive unit, said first and second conduit means serving to complete a hydraulic circuit between said hydrostatic drive units, means to operate the volume varying means of said at least one of said hydrostatic drive units, hydraulic means responsive to the pressure difference in said first and second conduit means for operating said volume varying operating means, together with mechanical control means to control one of said units for controlling the power transmitting shaft of said second unit.

13. A transmission according to claim 12 in which said operating means for the volume varying means comprises a cylinder together with a piston therein and a second cylinder and a piston therein, the two pistons being mechanically connected to each other and to said volume varying means, the first piston being actuated by the pressure difference in the said first and second conduit means and the second piston being hydraulically actuated under manual control.

14. A transmission according to claim 12 including sensing means responsive to the speed of said power supply shaft, a control cylinder, a piston slidable in said control cylinder, means to move said piston in response to said sensing means and means to hydraulically interconnect said control cylinder and said volume varying operating means.

15. A transmission adapted to be interposed between a power supply shaft and a power delivery shaft comprising in combination, at least one releasable coupling having a driving member operatively connected to said power supply shaft and a driven member operatively connected to said power delivery shaft, a first hydrostatic drive unit having a rotary power transmitting shaft operatively connected to the driving member of said coupling, a second hydrostatic drive unit having a rotary power transmitting shaft operatively connected to the driven member of said coupling, conduits hydraulically interconnecting said first and second hydrostatic units, and control means operated in accordance with the difference in speed of said two coupling members and acting upon at least one of said hydrostatic drive units, whereby synchronization of the two coupling members is effected, at least one of said hydrostatic drive units being of the type having a valve surface formed with intake and delivery ports, a cylinder block having a valve surface normally rotarily supported in sealing relationship upon said first valve surface and provided with cylinders each of which has a cylinder port formed in said cylinder block valve surface registering alternately with said intake and delivery ports, pistons in said cylinders, means for reciprocating said pistons in said cylinders and means for at times supplying sufficient pressure fluid between said valve surfaces to separate the valve surface of said cylinder block from sealing relationship with the first mentioned valve surface.

16. A transmission adapted to be interposed between a power supply shaft and a power delivery shaft comprising in combination, at least one releasable coupling having a driving member operatively connected to said power supply shaft and a driven member operatively connected to said power delivery shaft, a first hydrostatic drive unit having a rotary power transmitting shaft operatively connected to the driving member of said coupling, a second hydrostatic drive unit having a rotary power transmitting shaft operatively connected to the driven member of said coupling, conduits hydraulically interconnecting said first and second hydrostatic units, and control means operated in accordance with the difference in speed of said two coupling members and acting upon at least one of said hydrostatic drive units, whereby synchronization of the two coupling members is effected, at least one of said hydrostatic drive units being of the type having a valve surface formed with intake and delivery ports, a cylinder block having a valve surface normally rotarily supported in sealing relationship upon said first valve surface and provided with cylinders each of which has a cylinder port formed in said cylinder block valve surface registering alternately with said intake and delivery ports, pistons in said cylinders, means for reciprocating said pistons in said cylinders and means for at times supplying sufficient pressure fluid between said valve surfaces to separate the valve surface of said cylinder block from sealing relationship with the first mentioned valve surface, said pressure supply means comprising a normally open leakage fluid drainage conduit and valve means for at times blocking said drainage conduit.

17. A transmission adapted to be interposed between a power supply shaft and a power delivery shaft comprising in combination, at least one releasable coupling having a driving member operatively connected to said power supply shaft and a driven member operatively connected to said power delivery shaft, a first hydrostatic drive unit having a rotary power transmitting shaft operatively connected to the driving member of said coupling, a second hydrostatic drive unit having a rotary power transmitting shaft operatively connected to the driven member of said coupling, conduits hydraulically interconnecting said first and second hydrostatic units, and control means operated in accordance with the difference in speed of said two coupling members and acting upon at least one of said hydrostatic drive units, whereby synchronization of the two coupling members is effected, at least one of said hydrostatic drive units being of the type having a valve surface formed with intake and delivery ports, a cylinder block having a valve surface normally rotarily supported in sealing relationship upon said first valve surface and provided with cylinders each of which has a cylinder port formed in said cylinder block valve surface registering alternately with said intake and delivery ports, pistons in said cylinders, means for reciprocating said pistons in said cylinders and means for at times supplying sufficient pressure fluid between said valve surfaces to separate the valve surface of said cylinder block from sealing relationship with the first mentioned valve surface, said pressure supply means comprising a normally open leakage fluid drainage conduit and valve means for a times blocking said drainage conduit, and means for automatically closing said drainage blocking valve after the coupling has been engaged.

18. A transmission adapted to be interposed between a power supply shaft and a power delivery shaft including, in combination, a mechanical transmission comprising gears providing at least two definite mechanical gear ratios, relatively shiftable coupling members for coupling said gearing to engage one or another of said gear ratios at will, an hydraulic transmission connecting said supply shaft with said power delivery shaft, said hydraulic transmission comprising an hydrostatic drive unit driven by the power supply shaft and an hydrostatic drive unit operatively connected to drive the power delivery shaft, main conduits connecting the hydrostatic units, means for varying the volume per revolution of at least one of said hydrostatic units so that the hydraulic transmission can provide an infinitely variable ratio drive between the power supply shaft and the power delivery shaft, whereby the hydraulic transmission may be used for equalizing the speeds of the coupling members to be engaged or to relieve the pressure between coupling members to be disengaged, together with a control means for varying the drive ratio of the hydraulic transmission comprising a cylinder, a piston slidable in said cylinder and operatively connected to the volume varying means of at least one of said hydrostatic units, the piston being operated in accordance with the difference in the fluid pressure in the two main conduits of the hydraulic transmission.

19. A transmission adapted to be interposed between a power supply shaft and a power delivery shaft including, in combination, a mechanical transmission comprising gears providing at least two definite mechanical gear ratios, relatively shiftable coupling members for coupling said gearing to engage one or another of said gear ratios at will, an hydraulic transmission connecting said supply shaft with said power delivery shaft, said hydraulic transmission comprising an hydrostatic drive unit driven by the power supply shaft and an hydrostatic drive unit operatively connected to drive the power delivery shaft, main conduits connecting the hydrostatic units, means for varying the volume per revolution of at least one of said hydrostatic units so that the hydraulic transmission can provide an infinitely variable ratio drive between the power supply shaft and the power delivery shaft, whereby the hydraulic transmission may be used for equalizing the speeds of the coupling members to be engaged or to relieve the pressure between coupling members to be disengaged, together with a control means for varying the drive ratio of the hydraulic transmission comprising a cylinder, a piston slidable in said cylinder and operatively connected to the volume varying means of at least one of said hydrostatic units, the piston being operated in accordance with the difference in speed of the coupling members of the mechanical transmission to enable said coupling members to be engaged.

20. A transmission adapted to be interposed between a power supply shaft and a power delivery shaft including, in combination, a mechanical transmission comprising gears providing at least two definite mechanical gear ratios, relatively shiftable coupling members for coupling said gearing to engage one or another of said gear ratios at will, an hydraulic transmission connecting said supply shaft with said power delivery shaft, said hydraulic transmission comprising an hydrostatic drive unit driven by the power supply shaft and an hydrostatic drive unit operatively connected to drive the power delivery shaft, main conduits connecting the hydrostatic units, means for varying the volume per revolution of at least one of said hydrostatic units so that the hydraulic transmission can provide an infinitely variable ratio drive between the power supply shaft and the power delivery shaft, whereby the hydraulic transmission may be used for equalizing the speeds of the coupling members to be engaged or to relieve the pressure between coupling members to be disengaged, together with a control means for varying the drive ratio of the hydraulic transmission, comprising power means actuated in accordance with the difference in speed of the coupling members of the mechanical transmission to enable said coupling members to be engaged.

21. In a hydrostatic drive unit of the type having a valve surface formed with intake and delivery ports, a cylinder block having a valve surface normally rotarily supported upon said first valve surface in sealing relationship therewith and provided with generally axially arranged cylinders each of which has a cylinder port formed in said cylinder block surface to register alternately with said intake and delivery ports, pistons in said cylinders, and means for reciprocating said pistons in said cylinders, the improvement which comprises a duct for at times supplying sufficient pressure between said valve surfaces to move the surface of said cylinder block away from sealing relationship with said first mentioned valve surface, whereby said relatively rotating surfaces are separated so that the unit rotates ineffectively, said pressure supplying means comprising a normally open leakage drainage conduit and valve means for at times blocking said drainage conduit.

(References on following page)

References Cited in the file of this patent

UNITED STATES PATENTS

| | | |
|---|---|---|
| 2,580,946 | Orshanski et al. | Jan. 1, 1952 |
| 2,583,656 | Lay | Jan. 29, 1952 |
| 2,599,814 | Cull | June 10, 1952 |
| 2,618,988 | Woydt | Nov. 25, 1952 |
| 2,679,138 | Kane | May 25, 1954 |
| 2,735,407 | Born | Feb. 21, 1956 |
| 2,766,693 | Wells | Oct. 16, 1956 |
| 2,808,737 | Bullard | Oct. 8, 1957 |
| 2,891,419 | Badalini | June 23, 1959 |
| 2,901,979 | Henrichsen | Sept. 1, 1959 |
| 2,931,250 | Ebert | Apr. 5, 1960 |
| 2,972,962 | Douglas | Feb. 28, 1961 |

FOREIGN PATENTS

| | | |
|---|---|---|
| 1,024,812 | Germany | Feb. 20, 1958 |